(12) United States Patent
Mano et al.

(10) Patent No.: US 11,746,244 B2
(45) Date of Patent: Sep. 5, 2023

(54) ANTI-CORROSIVE MATERIAL, WIRE WITH TERMINAL, AND WIRE HARNESS

(71) Applicant: Yazaki Corporation, Tokyo (JP)

(72) Inventors: Kazuki Mano, Shizuoka (JP); Kenji Osada, Shizuoka (JP)

(73) Assignee: YAZAKI CORPORATION, Tokyo (JP)

(\*) Notice: Subject to any disclaimer, the term of this patent is extended or adjusted under 35 U.S.C. 154(b) by 0 days.

(21) Appl. No.: 17/511,672

(22) Filed: Oct. 27, 2021

(65) Prior Publication Data
US 2022/0127467 A1 Apr. 28, 2022

(30) Foreign Application Priority Data
Oct. 28, 2020 (JP) .................... 2020-180521

(51) Int. Cl.
| | |
|---|---|
| C09D 5/08 | (2006.01) |
| H01B 7/28 | (2006.01) |
| H01R 4/70 | (2006.01) |
| C09D 175/14 | (2006.01) |
| H01R 4/62 | (2006.01) |
| H01B 1/02 | (2006.01) |
| H01R 4/18 | (2006.01) |

(52) U.S. Cl.
CPC .............. *C09D 5/08* (2013.01); *C09D 175/14* (2013.01); *H01B 7/2806* (2013.01); *H01R 4/70* (2013.01); *H01B 1/02* (2013.01); *H01R 4/185* (2013.01); *H01R 4/62* (2013.01)

(58) Field of Classification Search
CPC ........ C09D 5/08; C09D 175/14; H01B 7/282; H01B 7/2806; H01R 4/70; H01R 4/185; H01R 4/62; H01R 13/52; H01R 13/5216; H01R 13/533
See application file for complete search history.

(56) References Cited

U.S. PATENT DOCUMENTS

| | | | |
|---|---|---|---|
| 2012/0112456 A1* | 5/2012 | Nagareo | C08F 290/06 285/390 |
| 2012/0199391 A1 | 8/2012 | Inoue et al. | |
| 2013/0062114 A1* | 3/2013 | Inoue | H01B 7/2806 252/396 |
| 2016/0308301 A1* | 10/2016 | Mano | C08F 220/68 |

FOREIGN PATENT DOCUMENTS

JP 2011-103266 A 5/2011

\* cited by examiner

*Primary Examiner* — Paresh Paghadal
(74) *Attorney, Agent, or Firm* — Sughrue Mion, PLLC

(57) ABSTRACT

An anti-corrosive material contains an ultraviolet curable resin including a polymerizable compound including at least one of a photopolymerizable (meth)acrylate monomer or a photopolymerizable (meth)acrylate oligomer. The anti-corrosive material has a viscosity of 18,900 mPa·s or less. The anti-corrosive material has an elongation rate of 60% or greater as a result of heating at 120° C. for 4,000 hours after curing.

4 Claims, 3 Drawing Sheets

ANTI-CORROSIVE MATERIAL, WIRE WITH TERMINAL, AND WIRE HARNESS

CROSS-REFERENCE TO RELATED APPLICATIONS

The present application is based on, and claims priority from Japanese Patent Application No. 2020-180521, filed on Oct. 28, 2020, the entire contents of which are incorporated herein by reference.

1. Technical Field

The present disclosure relates to an anti-corrosive material, a wire with a terminal, and a wire harness.

2. Background

In recent years, use of aluminum in a coated wire constituting a wire harnesses has been increasing to reduce a weight of a vehicle and thus increase the fuel efficiency of the vehicle. Further, a metal terminal to be connected to such a coated wire is usually formed of copper or a copper alloy having excellent electrical properties. However, when different materials are used for a conductor of the coated wire and the metal terminal, corrosion of a joint between the conductor and the metal terminal is easily caused. Thus, an anti-corrosive material is required to prevent corrosion of the joint.

Japanese Unexamined Patent Application Publication No. 2011-103266 discloses a coated wire with a terminal formed of an anti-corrosive material containing a thermoplastic polyamide resin as a main component, and having a tensile shear strength of 6 N/mm$^2$ or greater for a bundle of aluminum, an elongation rate of 100% or greater, and a moisture absorbing rate of 1.0% or less.

SUMMARY

In Japanese Unexamined Patent Application Publication No. 2011-103266, the joint between the metal terminal and the wire is covered with a predetermined anti-corrosive material to prevent corrosion of the joint. However, it is required to cover the entire circumference of the joint with the anti-corrosive material having a sufficient thickness so as to secure sufficient anti-corrosive performance, and an outer dimension of the anti-corrosive material disadvantageously exceeds a dimension of the joint to a large extent. For this reason, in some cases, the anti-corrosive material cannot be inserted into a cavity of a connector housing when the metal terminal is accommodated in the connector housing. Therefore, an opening dimension of the cavity of the connector housing needs to be increased, which leads to change of design of the connector housing. Thus, there may be a risk that an existing connector housing cannot be used.

The present disclosure has an object to provide an anti-corrosive material capable of preventing corrosion while suppressing increase in outer dimension of a joint between a metal terminal and a wire, a wire with a terminal, and a wire harness using the same.

An anti-corrosive material according to an aspect of the present disclosure includes an ultraviolet curable resin including a polymerizable compound including at least one of a photopolymerizable (meth)acrylate monomer or a photopolymerizable (meth)acrylate oligomer. The polymerizable compound includes a combination of a monofunctional (meth)acrylate monomer and a bifunctional (meth)acrylate monomer, or a combination of at least one of a monofunctional (meth)acrylate monomer or a bifunctional (meth)acrylate monomer and at least one of a trifunctional (meth)acrylate monomer or a polyfunctional (meth)acrylate monomer having four or more functional groups. The anti-corrosive material has a viscosity of 18,900 mPa·s or less, the viscosity being measured at 25° C. according to JIS Z8803. The anti-corrosive material has an elongation rate of 60% or greater as a result of heating at 120° C. for 4,000 hours after curing.

An anti-corrosive material according to another aspect of the present disclosure includes an ultraviolet curable resin including a polymerizable compound including at least one of a photopolymerizable (meth)acrylate monomer or a photopolymerizable (meth)acrylate oligomer. The polymerizable compound includes a combination of a monofunctional (meth)acrylate monomer and a bifunctional (meth)acrylate monomer, or a combination of at least one of a monofunctional (meth)acrylate monomer or a bifunctional (meth)acrylate monomer and at least one of a trifunctional (meth)acrylate monomer or a polyfunctional (meth)acrylate monomer having four or more functional groups. The anti-corrosive material has a viscosity of 18,900 mPa·s or less, the viscosity being measured at 25° C. according to JIS Z8803. The anti-corrosive material has an elongation rate of 60% or greater as a result of repeating a cycle 1,000 times after curing. In one cycle, the anti-corrosive material after curing is maintained at −40° C. for 30 minutes, and is maintained at 120° C. for 30 minutes.

An anti-corrosive material according to another aspect of the present disclosure includes an ultraviolet curable resin including a polymerizable compound including at least one of a photopolymerizable (meth)acrylate monomer or a photopolymerizable (meth)acrylate oligomer. The polymerizable compound includes a combination of a monofunctional (meth)acrylate monomer and a bifunctional (meth)acrylate monomer, or a combination of at least one of a monofunctional (meth)acrylate monomer or a bifunctional (meth)acrylate monomer and at least one of a trifunctional (meth)acrylate monomer or a polyfunctional (meth)acrylate monomer having four or more functional groups. The anti-corrosive material has a viscosity of 18,900 mPa·s or less, the viscosity being measured at 25° C. according to JIS Z8803. A glass transition temperature after curing of the anti-corrosive material is 29° C. or higher.

A wire with a terminal according to another aspect of the present disclosure includes a wire including a conductor and a wire covering member configured to cover the conductor. The wire with a terminal includes a metal terminal including a conductor press-fitting portion that is electrically connected to the conductor and a covering member crimping portion that is mechanically connected to the wire covering member. The wire with a terminal includes a sealing member configured to cover a joint between the conductor and the metal terminal, the sealing member being formed by curing the anti-corrosive material. The anti-corrosive material includes an ultraviolet curable resin including a polymerizable compound including at least one of a photopolymerizable (meth)acrylate monomer or a photopolymerizable (meth)acrylate oligomer. The polymerizable compound includes a combination of a monofunctional (meth)acrylate monomer and a bifunctional (meth)acrylate monomer, or a combination of at least one of a monofunctional (meth)acrylate monomer or a bifunctional (meth)acrylate monomer and at least one of a trifunctional (meth)acrylate monomer or a polyfunctional (meth)acrylate monomer having four or more functional groups. The anti-corrosive material has a viscosity of 18,900 mPa·s or less, the viscosity being measured at 25° C. according to JIS Z8803. The total height of the conductor press-fitting portion and the sealing member is smaller than the height of the covering member crimping portion.

A wire with a terminal according to another aspect of the present disclosure includes a wire including a conductor and a wire covering member configured to cover the conductor. The wire with a terminal includes a metal terminal including a conductor press-fitting portion that is electrically connected to the conductor and a covering member crimping portion that is mechanically connected to the wire covering member. The wire with a terminal includes a sealing member configured to cover a joint between the conductor and the metal terminal and the entire borderline between the wire and the covering member crimping portion, the sealing member being formed by curing the anti-corrosive material. The anti-corrosive material includes an ultraviolet curable resin including a polymerizable compound including at least one of a photopolymerizable (meth)acrylate monomer or a photopolymerizable (meth)acrylate oligomer. The polymerizable compound includes a combination of a monofunctional (meth)acrylate monomer and a bifunctional (meth)acrylate monomer, or a combination of at least one of a monofunctional (meth)acrylate monomer or a bifunctional (meth)acrylate monomer and at least one of a trifunctional (meth)acrylate monomer or a polyfunctional (meth)acrylate monomer having four or more functional groups. The anti-corrosive material has a viscosity of 18,900 mPa·s or less, the viscosity being measured at 25° C. according to JIS Z8803.

A wire with a terminal according to another aspect of the present disclosure includes a wire including a conductor and a wire covering member configured to cover the conductor. The wire with a terminal includes a metal terminal including a conductor press-fitting portion that is electrically connected to the conductor and a covering member crimping portion that is mechanically connected to the wire covering member. The wire with a terminal includes a sealing member configured to cover a joint between the conductor and the metal terminal, the sealing member being formed by curing the anti-corrosive material. The anti-corrosive material includes an ultraviolet curable resin including a polymerizable compound including at least one of a photopolymerizable (meth)acrylate monomer or a photopolymerizable (meth)acrylate oligomer. The polymerizable compound includes a combination of a monofunctional (meth)acrylate monomer and a bifunctional (meth)acrylate monomer, or a combination of at least one of a monofunctional (meth)acrylate monomer or a bifunctional (meth)acrylate monomer and at least one of a trifunctional (meth)acrylate monomer or a polyfunctional (meth)acrylate monomer having four or more functional groups. The anti-corrosive material has a viscosity of 18,900 mPa·s or less, the viscosity being measured at 25° C. according to JIS Z8803. The metal terminal includes a metal base material, an inner plating provided to a surface of the metal base material on which the conductor is arranged, and an outer plating provided to the other surface of the metal base material with respect to the conductor. The anti-corrosive material covers a part of the metal base material and the inner plating at an edge of the metal terminal between the conductor press-fitting portion and the covering member crimping portion.

According to the present disclosure, there can be provided the anti-corrosive material capable of preventing corrosion while suppressing increase in outer dimension of the joint between the metal terminal and the wire, the wire with a terminal, and the wire harness using the same.

DETAILED DESCRIPTION

Figure 1:
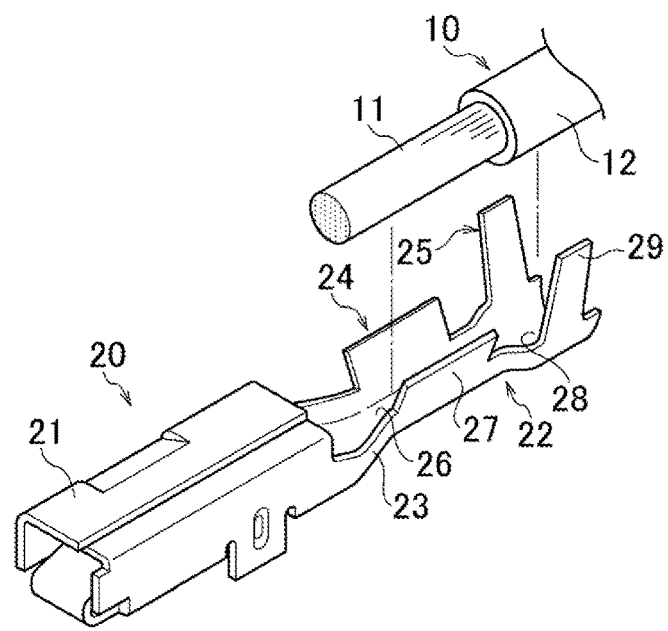
FIG. 1 is a schematic view of a wire with a terminal according to the present embodiment for illustrating a state before the wire is connected to a metal terminal.

Now, with reference to the drawings, an anti-corrosive material, a wire with a terminal, and a wire harness according to the present embodiment are described. Note that dimensional ratios in the drawings are overdrawn for convenience of description, and may be different from actual dimensional ratios in some cases.

[Anti-Corrosive Material]

The anti-corrosive material according to the present embodiment covers a joint constituted of different metal parts so as to prevent entrance of corroding substances, and thus prevents corrosion of the joint for a long time period. Further, the anti-corrosive material according to the present embodiment contains an ultraviolet curable resin.

A resin containing, as a main component, a polymerizable compound including at least one of a photopolymerizable (meth)acrylate monomer or a photopolymerizable (meth)acrylate oligomer is used as the ultraviolet curable resin. However, a resin containing, as a main component, a polymerizable compound including a photopolymerizable (meth)acrylate monomer is preferably used. Further, a resin containing, as a main component, a polymerizable compound including both a photopolymerizable (meth)acrylate monomer and a photopolymerizable (meth)acrylate oligomer is further preferably used as the ultraviolet curable resin. When the acrylate-based polymerizable compound described above is used as the ultraviolet curable resin, a sealing member obtained by curing the resin has a high adhesive force, and has excellent weather resistance and impact resistance. Thus, corrosion of the joint can be prevented.

Here, the photopolymerizable (meth)acrylate monomer and the photopolymerizable (meth)acrylate oligomer each have a functional group having a carbon-carbon unsaturated bond. Further, the photopolymerizable (meth)acrylate monomer is categorized into a monofunctional (meth)acrylate monomer having one functional group, a bifunctional (meth)acrylate monomer having two functional groups, a trifunctional (meth)acrylate monomer having three functional groups, and polyfunctional (meth)acrylate monomer having four or more functional groups. Further, the photopolymerizable (meth)acrylate oligomer is categorized into a monofunctional (meth)acrylate oligomer having one functional group, a bifunctional (meth)acrylate oligomer having two functional groups, a trifunctional (meth)acrylate oligomer having three functional groups, and polyfunctional (meth)acrylate oligomer having four or more functional groups.

As the monomer contained in the ultraviolet curable resin, at least one of a trifunctional (meth)acrylate monomer or a polyfunctional (meth)acrylate monomer is used instead of a monofunctional (meth)acrylate monomer and a bifunctional (meth)acrylate monomer. In this case, a cross linking density of a cured object tends to increase after curing the resin. For this reason, such a cured object obtained by curing the ultraviolet curable resin has improved strength and hardness, and also has high surface curability (tackiness). However, due to the trade-off, the cured object has reduced elongation and depth curability, and the cured object to be obtained disadvantageously peels off. Thus, it is difficult to prevent corrosion for a long time period.

For this reason, in the polymerizable compound of the ultraviolet curable resin of the present embodiment, a monofunctional (meth)acrylate monomer and a bifunctional (meth)acrylate monomer are used in combination. Alternatively, in the polymerizable compound, at least one of a monofunctional (meth)acrylate monomer or a bifunctional (meth)acrylate monomer and at least one of a trifunctional (meth)acrylate monomer or a polyfunctional (meth)acrylate monomer having four or more functional groups are used in combination. When a (meth)acrylate compound having a small number of functional groups and a (meth)acrylate compound having a large number of functional groups are mixed instead of using only a polyfunctional (meth)acrylate monomer having three or more functional groups, the cross linking density of the cured object to be obtained can be prevented from increasing excessively. For this reason, the cured object to be obtained can have improved elongation and depth curability in addition to strength, hardness, and surface curability. As a result, the cured object to be obtained can be prevented from peeling off at the joint formed of different materials, and can prevent corrosion of the joint for a long time period. Note that depth curability is an index indicating a depth at which the resin is cured when being irradiated with light from above. Further, throughout the specification, the term "(meth)acrylate" includes both acrylate and methacrylate.

Usable monofunctional acrylate monomers are compounds represented by Chemical Formula 1. Specific examples thereof include ethoxylated o-phenylphenol acrylate (see Chemical Formula (a), viscosity: 150 mPa·s at a temperature of 25° C.), methoxypolyethylene glycol 400 acrylate (see Chemical Formula (b), where n=9, viscosity: 28 mPa·s at a temperature of 25° C.), methoxypolyethylene glycol 550 acrylate (see Chemical Formula (b), where n=13), phenoxypolyethylene glycol acrylate (see Chemical Formula (c), viscosity: 16 mPa·s at a temperature of 25° C.), 2-acryloyloxyethyl succinate (see Chemical Formula (d), viscosity: 180 mPa·s at a temperature of 25° C.), and isostearyl acrylate (see Chemical Formula (e), viscosity: 18 mPa·s at a temperature of 25° C.) produced by Shin Nakamura Chemical Co., Ltd. Further, other examples of the monofunctional acrylate monomer include β-carboxyethyl acrylate (viscosity: 75 mPa·s at a temperature of 25° C.), isobornyl acrylate (viscosity: 9.5 mPa·s at a temperature of 25° C.), octyl/decyl acrylate (viscosity: 3 mPa·s at a temperature of 25° C.), ethoxylated phenyl acrylate (EO: 2 mol) (viscosity: 20 mPa·s at a temperature of 25° C.), and ethoxylated phenyl acrylate (EO: 1 mol) (viscosity: 10 mPa·s at a temperature of 25° C.) produced by DAICEL-ALLNEX LTD.

[Chem. 1]

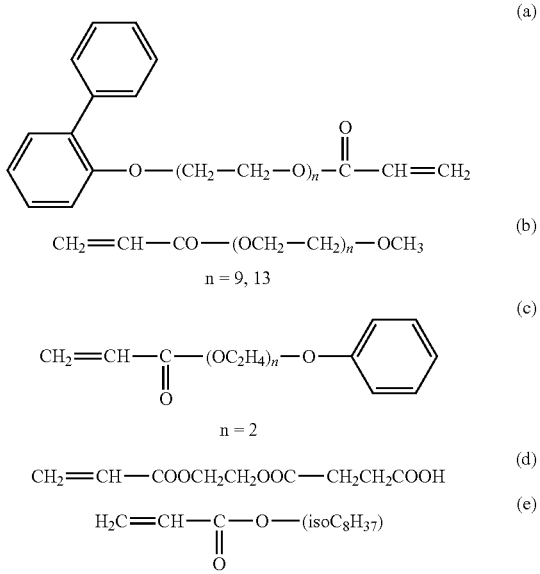

Usable bifunctional acrylate monomers are compounds represented by Chemical Formula 2-1 to Chemical Formula 2-3. Specific example thereof include 2-hydroxy-3-(acryloyloxy)propyl methacrylate (see Chemical Formula (a), viscosity: 44 mPa·s at a temperature of 25° C.), polyethylene glycol 200 diacrylate (see Chemical Formula (b), n=4, viscosity: 22 mPa·s at a temperature of 25° C.), polyethylene glycol 400 diacrylate (see Chemical Formula (b), n=9, viscosity: 58 mPa·s at a temperature of 25° C.), polyethylene glycol 600 diacrylate (see Chemical Formula (b), n=14, viscosity: 106 mPa·s at a temperature of 25° C.), polyethylene glycol 1000 diacrylate (see Chemical Formula (b), n=23, viscosity: 100 mPa·s at a temperature of 40° C.), propoxylated ethoxylated bisphenol A diacrylate (see Chemical Formula (c), viscosity: 500 mPa·s at a temperature of 25° C.), ethoxylated bisphenol A diacrylate (see Chemical Formula (d), viscosity: 1500 mPa·s at a temperature of 25° C.), 9,9-bis[4-(2-acryloyloxyethoxy)phenyl]fluorene (see Chemical Formula (e), viscosity: 91,000 mPa·s at a temperature of 60° C.), propoxylated bisphenol A diacrylate (see Chemical Formula (f), viscosity: 3000 mPa·s at a temperature of 25° C.), tricyclodecane dimethanol diacrylate (see Chemical Formula (g), viscosity: 120 mPa·s at a temperature of 25° C.), 1,10-decanediol diacrylate (see Chemical Formula (h), viscosity: 10 mPa·s at a temperature of 25° C.), 1,6-hexanediol diacrylate (see Chemical Formula (i), viscosity: 8 mPa·s at a temperature of 25° C.), 1,9-nonanediol diacrylate (see Chemical Formula (j), viscosity: 8 mPa·s at a temperature of 25° C.), dipropylene glycol diacrylate (see Chemical Formula (k), viscosity: 8 mPa·s at a temperature of 25° C.), tripropylene glycol diacrylate (see Chemical Formula (l), m+n=3, viscosity: 12 mPa·s at a temperature of 25°

C.), polypropylene glycol 400 diacrylate (see Chemical Formula (l), m+n=7, viscosity: 34 mPa·s at a temperature of 25° C.), polypropylene glycol 700 diacrylate (see Chemical Formula (l), m+n=12, viscosity: 68 mPa·s at a temperature of 25° C.), and polytetramethylene glycol 650 diacrylate (see Chemical Formula (m), viscosity: 140 mPa·s at a temperature of 25° C.) produced by Shin Nakamura Chemical Co., Ltd. Further, other examples of the bifunctional acrylate monomer include dipropylene glycol diacrylate (viscosity: 10 mPa·s at a temperature of 25° C.), 1,6-hexanediol diacrylate (viscosity: 6.5 mPa·s at a temperature of 25° C.), tripropylene glycol diacrylate (viscosity: 12.5 mPa·s at a temperature of 25° C.), PO-modified neopentyl glycol diacrylate (viscosity: 20 mPa·s at a temperature of 25° C.), modified bisphenol A diacrylate (viscosity: 1100 mPa·s at a temperature of 25° C.), tricyclodecane dimethanol diacrylate (viscosity: 140 mPa·s at a temperature of 25° C.), PEG 400 diacrylate (viscosity: 60 mPa·s at a temperature of 25° C.), PEG 600 diacrylate (viscosity: 120 mPa·s at a temperature of 25° C.), and neopentyl glycol-hydroxypivalic acid ester diacrylate (viscosity: 25 mPa·s at a temperature of 25° C.) produced by DAICEL-ALLNEX LTD.

[Chem. 2-1]

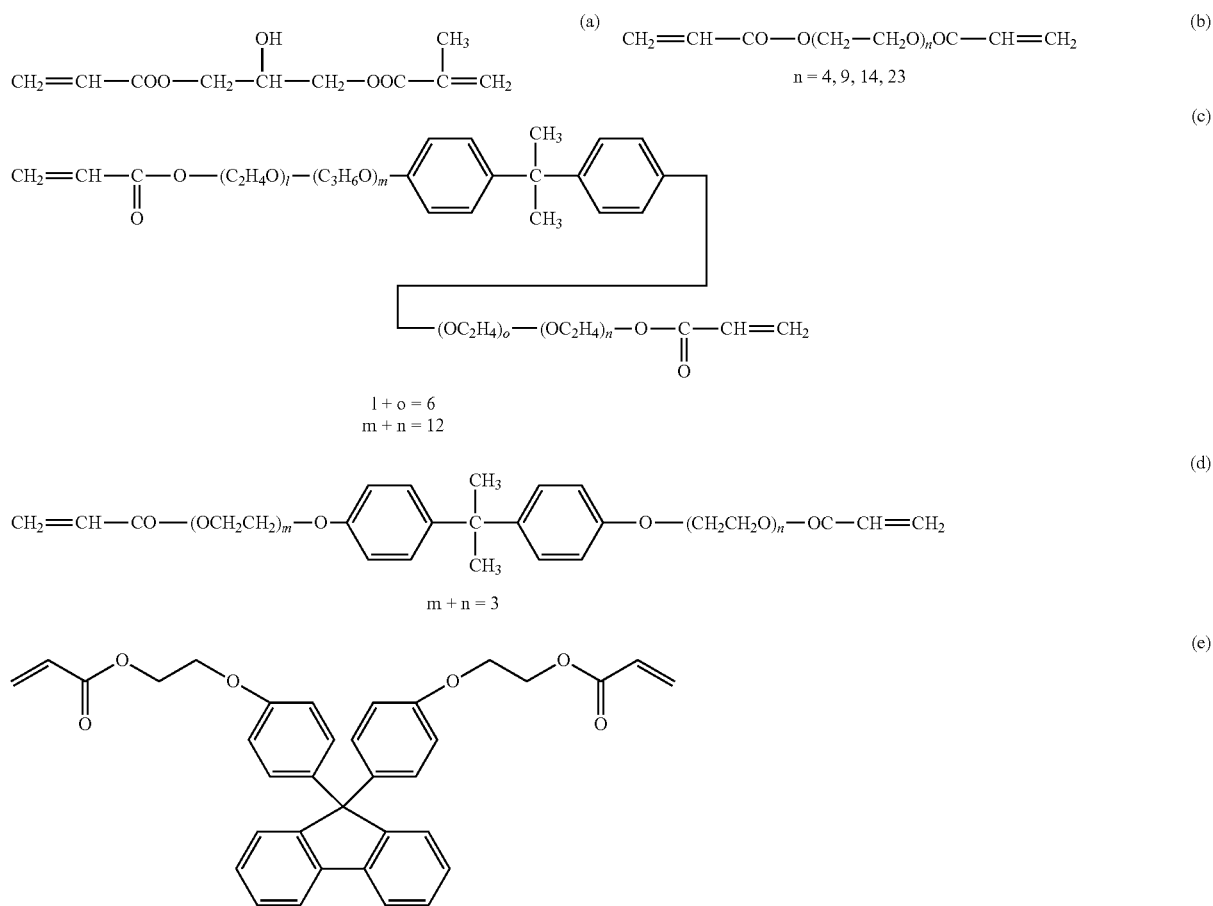

[Chem. 2-2]

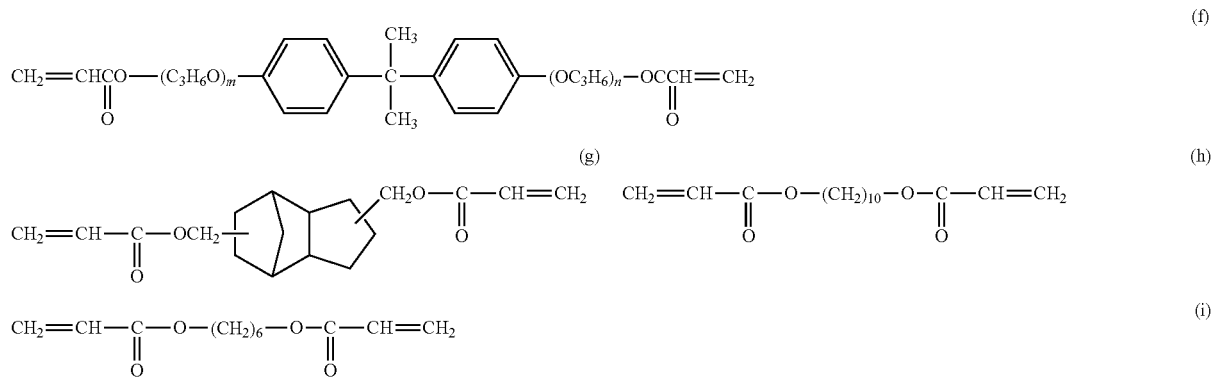

[Chem. 2-3]

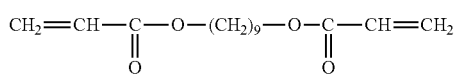
(j)

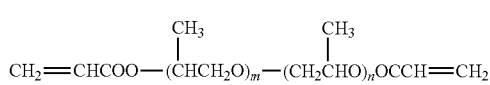
m + n = 3, 7, 12

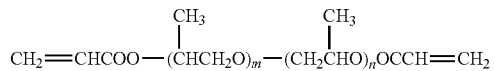
m + n = 2
(k)

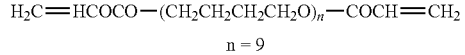
n = 9
(l)

(m)

Usable trifunctional acrylate monomers and polyfunctional acrylate monomers are compounds represented by Chemical Formula 3-1 to Chemical Formula 3-2. Specific examples thereof include ethoxylated isocyanuric acid triacrylate (see Chemical Formula (a), viscosity: 1,000 mPa·s at a temperature of 50° C.), 6-caprolactone modified tris-(2-acryloxyethyl) isocyanurate (see Chemical Formula (b), viscosity: 3,000 to 4,000 mPa·s at a temperature of 25° C.), ethoxylated glycerine triacrylate (EO: 9 mol) (see Chemical Formula (c), l+m+n=9, viscosity: 190 mPa·s at a temperature of 25° C.), ethoxylated glycerine triacrylate (EO: 20 mol) (see Chemical Formula (c), l+m+n=20, viscosity: 110 mPa·s at a temperature of 25° C.), pentaerythritol triacrylate (tri-ester: 37%) (see Chemical Formula (d), viscosity: 790 mPa·s at a temperature of 25° C.), pentaerythritol triacrylate (tri-ester: 55%) (see Chemical Formula (d), viscosity: 490 mPa·s at a temperature of 25° C.), pentaerythritol triacrylate (tri-ester: 57%) (see Chemical Formula (d), viscosity: 730 mPa·s at a temperature of 25° C.), trimethylolpropane triacrylate (see Chemical Formula (e), viscosity: 110 mPa·s at a temperature of 25° C.), ditrimethylolpropane tetraacrylate (see Chemical Formula (f), viscosity: 1,000 mPa·s at a temperature of 25° C.), ethoxylated pentaerythritol tetraacrylate (see Chemical Formula (g), viscosity: 350 mPa·s at a temperature of 25° C.), pentaerythritol tetraacrylate (see Chemical Formula (h), viscosity: 200 mPa·s at a temperature of 40° C.), dipentaerythritol polyacrylate (see Chemical Formula (i), viscosity: 6,500 mPa·s at a temperature of 25° C.), and dipentaerythritol hexaacrylate (see Chemical Formula (j), viscosity: 6,600 mPa·s at a temperature of 25° C.) produced by Shin Nakamura Chemical Co., Ltd. Further, examples of the polyfunctional acrylate monomer include dipentaerythritol pentaacrylate, phthalic acid monohydroxyethylacrylate, and isocyanuric acid ethylene oxide modified-diacrylate.

[Chem. 3-1]

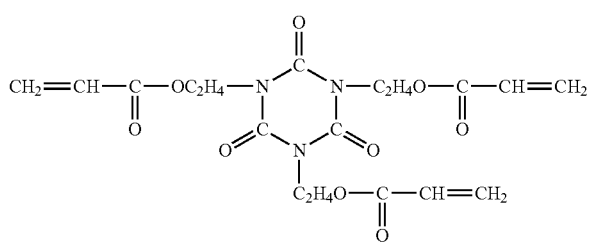
(a)

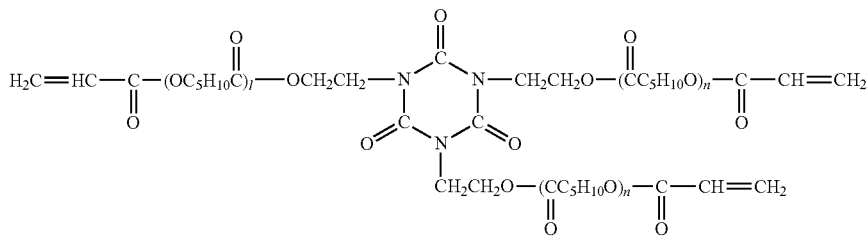
l + m + n ≈ 1
(b)

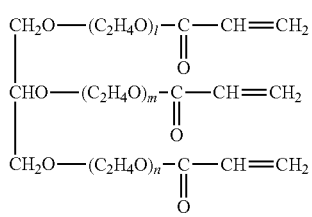
l + m + n = 9, 20
(c)

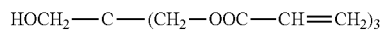
(d)

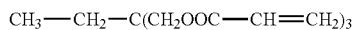
(e)

[Chem. 3-2]

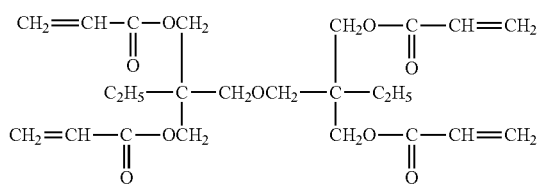
(f)

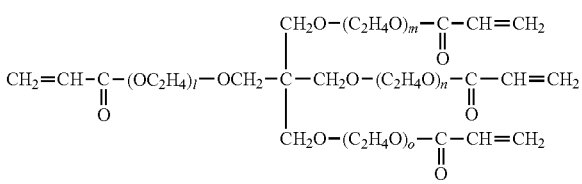
(g)

$l + m + n + o = 35$

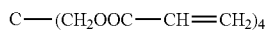
(h)

(i)

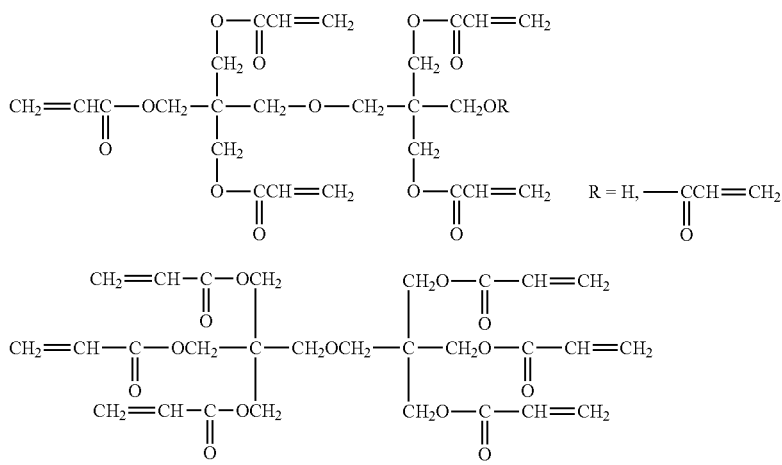

$R = H, -\overset{\overset{\displaystyle O}{\|}}{C}CH=CH_2$ (j)

Other examples of the trifunctional acrylate monomer include pentaerythritol (tri/tetra) acrylate (viscosity: 1100 mPa·s at a temperature of 25° C.), trimethylolpropane triacrylate (viscosity: 100 mPa·s at a temperature of 25° C.), trimethylolpropane ethoxytriacrylate (viscosity: 60 mPa·s at a temperature of 25° C.), trimethylolpropane propoxytriacrylate (viscosity: 90 mPa·s at a temperature of 25° C.), and glycerin propoxytriacrylate (viscosity: 100 mPa·s at a temperature of 25° C.) produced by DAICEL-ALLNEX LTD. Other examples of the polyfunctional acrylate monomer having four or more functional groups include pentaerythritol ethoxytetraacrylate (viscosity: 160 mPa·s at a temperature of 25° C.), ditrimethylolpropane tetraacrylate (viscosity: 1,000 mPa·s at a temperature of 25° C.), pentaerythritol (tri/tetra) acrylate (viscosity: 700 mPa·s at a temperature of 25° C.), and dipentaerythritol hexaacrylate (viscosity: 6,900 mPa·s at a temperature of 25° C.) produced by DAICEL-ALLNEX LTD.

Usable monofunctional methacrylate monomers are compounds represented by Chemical Formula 4. Specific examples thereof include 2-methacryloyloxyethyl phthalic acid (see Chemical Formula (a), viscosity: 3,400 mPa·s at a temperature of 25° C.), methoxy polyethylene glycol 400 methacrylate (see Chemical Formula (b), n=9, viscosity: 23 mPa·s at a temperature of 25° C.), methoxy polyethylene glycol 1000 methacrylate (see Chemical Formula (b), n=23, viscosity: 55 mPa·s at a temperature of 40° C.), phenoxy ethylene glycol methacrylate (see Chemical Formula (c), viscosity: 7 mPa·s at a temperature of 25° C.), stearyl methacrylate (see Chemical Formula (d), viscosity: 8 mPa·s at a temperature of 30° C.), and 2-methacryloyloxyethyl succinate (see Chemical Formula (e), viscosity: 160 mPa·s at a temperature of 25° C.) produced by Shin Nakamura Chemical Co., Ltd.

[Chem. 4]

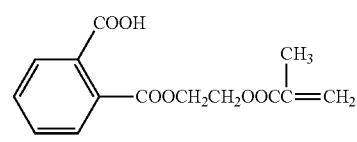
(a)

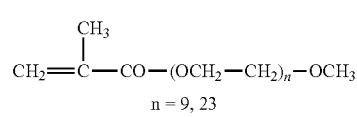
(b)

$n = 9, 23$

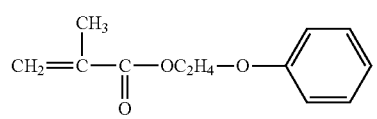
(c)

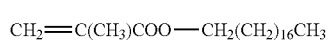
(d)

(e)

Usable bifunctional methacrylate monomers are compounds represented by Chemical Formula 5-1 and Chemical Formula 5-2. Specific examples thereof include ethylene glycol dimethacrylate (see Chemical Formula (a), viscosity: 3 mPa·s at a temperature of 25° C.), diethylene glycol dimethacrylate (see Chemical Formula (b), n=2, viscosity: 5 mPa·s at a temperature of 25° C.), triethylene glycol dimethacrylate (see Chemical Formula (b), n=3, viscosity: 9 mPa·s at a temperature of 25° C.), polyethylene glycol 200 dimethacrylate (see Chemical Formula (b), n=4, viscosity: 14 mPa·s at a temperature of 25° C.), polyethylene glycol 400 dimethacrylate (see Chemical Formula (b), n=9, viscosity: 35 mPa·s at a temperature of 25° C.), polyethylene glycol 600 dimethacrylate (see Chemical Formula (b), n=14, viscosity: 64 mPa·s at a temperature of 25° C.), polyethylene glycol 1000 dimethacrylate (see Chemical Formula (b), n=23, viscosity: 80 mPa·s at a temperature of 40° C.), ethoxylated bisphenol A dimethacrylate (see Chemical Formula (c), viscosity: 1000 mPa·s at a temperature of 25° C.), tricyclodecane dimethanol dimethacrylate (see Chemical Formula (d), viscosity: 100 mPa·s at a temperature of 25° C.), 1,10-decanediol dimethacrylate (see Chemical Formula (e), viscosity: 10 mPa·s at a temperature of 25° C.), 1,6-hexanediol dimethacrylate (see Chemical Formula (f), viscosity: 6 mPa·s at a temperature of 25° C.), 1,9-nonanediol dimethacrylate (see Chemical Formula (g), viscosity: 8 mPa·s at a temperature of 25° C.), neopentyl glycol dimethacrylate (see Chemical Formula (h), viscosity: 5 mPa·s at a temperature of 25° C.), ethoxylated polypropylene glycol 700 dimethacrylate (see Chemical Formula (i), viscosity: 90 mPa·s at a temperature of 25° C.), glycerin dimethacrylate (see Chemical Formula (j), viscosity: 40 mPa·s at a temperature of 25° C.), and polypropylene glycol 400 dimethacrylate (see Chemical Formula (k), viscosity: 27 mPa·s at a temperature of 25° C.) produced by Shin Nakamura Chemical Co., Ltd.

Usable trifunctional methacrylate monomers are compounds represented by Chemical Formula 6. Specific examples thereof include trimethylolpropane trimethacrylate (viscosity: 42 mPa·s at a temperature of 25° C.) produced by Shin Nakamura Chemical Co., Ltd.

[Chem. 6]

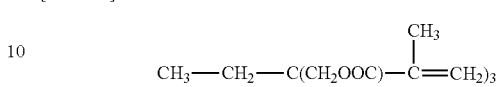

Further, usable photopolymerizable (meth)acrylate oligomers are aromatic urethane acrylate, aliphatic urethane acrylate, polyester acrylate, and epoxy acrylate produced by DAICEL-ALLNEX LTD. Further, examples of the epoxy acrylate include bisphenol A epoxy acrylate, epoxyfied soybean oil acrylate, modified epoxy acrylate, fatty acid-modified epoxy acrylate, and amine-modified bisphenol A epoxy acrylate.

Examples of the photopolymerizable (meth)acrylate oligomer include acrylic acrylate such as polybasic acid-modified acrylic oligomer, and silicone acrylate.

However, preferred monofunctional (meth)acrylate monomers are isobornyl acrylate and ethoxylated pheny-

[Chem. 5-1]

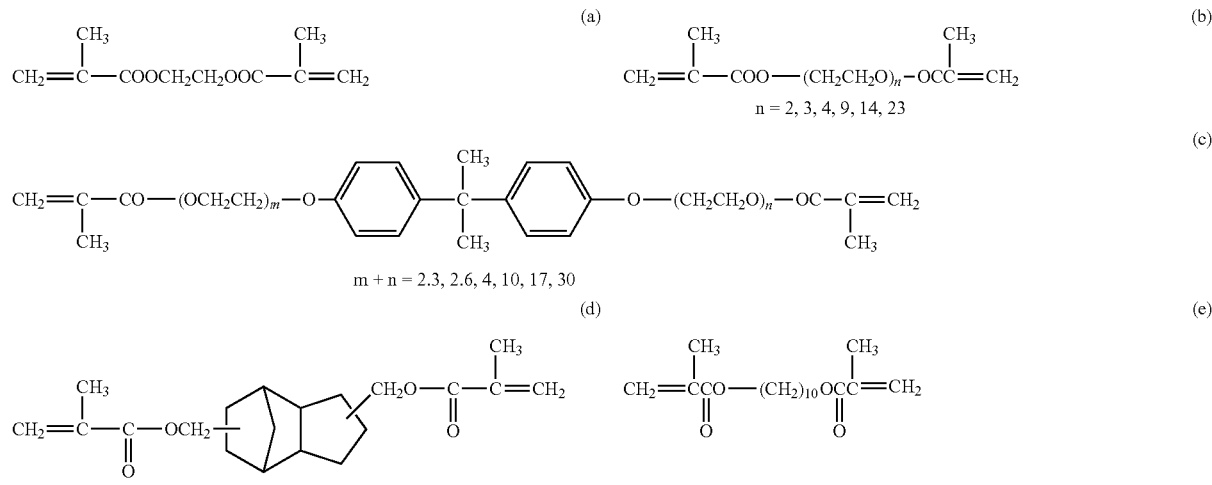

[Chem. 5-2]

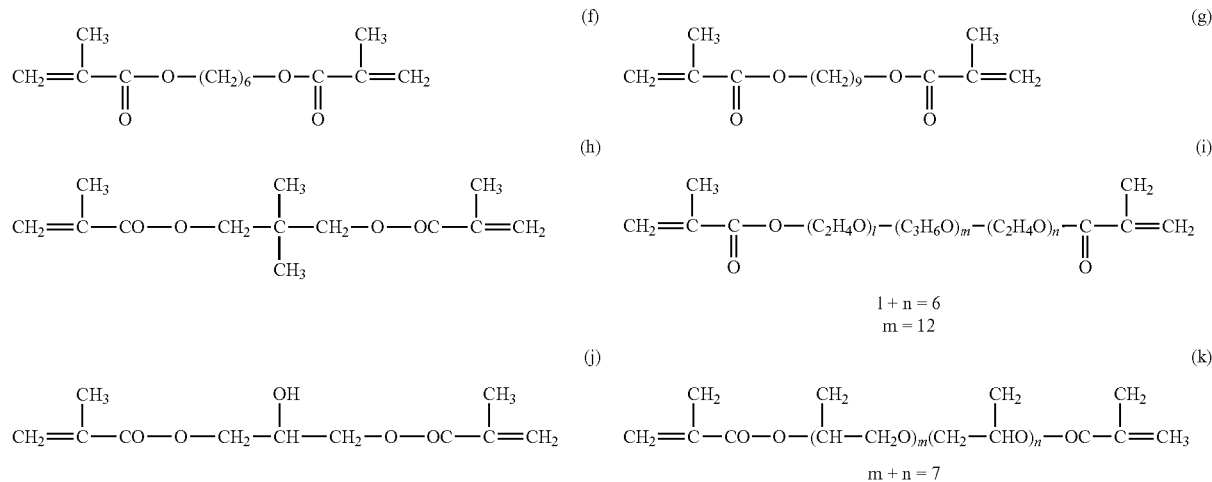

lacrylate. Preferred bifunctional (meth)acrylate monomers are 2-hydroxy-3-(acryloyloxy)propyl methacrylate and dipropylene glycol diacrylate. Preferred trifunctional (meth) acrylate monomers are glycerin propoxytriacrylate and trimethylolpropane propoxytriacrylate. Preferred polyfunctional (meth)acrylate monomers having four or more functional groups are pentaerythritol ethoxytetraacrylate and ditrimethylolpropane tetraacrylate.

Note that, in the polymerizable compound of the present embodiment, a mixing ratio of the monofunctional (meth)acrylate monomer, the bifunctional (meth)acrylate monomer, the trifunctional (meth)acrylate monomer, and the polyfunctional (meth)acrylate monomer having four or more functional groups is not limited to Examples described later, and may be set in a freely-selective manner so as to obtain effects of the present embodiment.

The ultraviolet curable resin according to the present embodiment preferably contains a photopolymerization initiator for accelerating ultraviolet light curing, in addition to the above-mentioned polymerizable compound. The photopolymerization initiator is a compound that initiates a polymerization reaction of the photopolymerizable monomer or the photopolymerizable oligomer. The photopolymerization initiator is a substance that absorbs a light component having a specific wavelength from ultraviolet light, is excited, and then generates radicals.

The ultraviolet curable resin according to the present embodiment contains the above-mentioned polymerizable compound as a main component. Further, the ultraviolet curable resin according to the present embodiment may contain other monomers and oligomers in addition to the above-mentioned polymerizable compound. Moreover, the ultraviolet curable resin may contain at least one of the additives listed below. Usable additives include photopolymerization initiating assistant agents, anti-adhesive agents, fillers, plasticizers, non-reactive polymers, coloring agents, flame retardants, flame retardant assistant agents, anti-softening agents, mold release agents, desiccants, dispersants, wetting agents, anti-settling agents, thickeners, anti-electrification agents, antistatic agents, matting agents, antiblocking agents, anti-skinning agents, and surfactants.

As described above, the anti-corrosive material according to the present embodiment contains the above-mentioned ultraviolet curable resin. For this reason, the anti-corrosive material is cured instantaneously through irradiation with ultraviolet light, and a washing step or a drying step is not required. Thus, subsequent steps can be performed immediately, and the process can be shortened. However, in a case where the viscosity of the ultraviolet curable resin is excessively high, when the ultraviolet curable resin is applied to the joint, the application thickness is excessively increased. As a result, the thickness of the coating (sealing member) that is obtained through curing is increased. For this reason, as described later, when a metal terminal is accommodated in a connector housing, the anti-corrosive material cannot be inserted into a cavity of the connector housing. Thus, there may be a risk that an existing connector housing cannot be used.

In view of this, the anti-corrosive material according to the present embodiment has a viscosity of 18,900 mPa·s or less, the viscosity being measured at 25° C. according to JIS Z8803 (the method of measuring a viscosity of a liquid). For this reason, the application thickness can be prevented from being excessively increased, and the thickness of the coating (sealing member) that is obtained through curing is not increased. Thus, an existing connector housing can be used. Note that the minimum value of the viscosity of the anti-corrosive material is not particularly limited, and may be set to 300 mPa·s, for example. When the viscosity of the anti-corrosive material is equal to or greater than this value, dripping during application to the joint is suppressed. Thus, the thickness of the coating that is obtained through curing can be substantially even, and anti-corrosive performance can be improved.

Note that the viscosity of the anti-corrosive material changes depending on a viscosity of each of the photopolymerizable (meth)acrylate monomer and the photopolymerizable (meth)acrylate oligomer, and an added amount of each of the monomer and the oligomer. Further, unless the polymerizable compound is irradiated with ultraviolet light to advance a polymerization reaction, the monomers, and the monomers and the oligomers are not polymerized to increase the viscosity of the polymerizable compound. For this reason, the viscosity of the anti-corrosive material, which is obtained by adjusting the viscosity and the added amount of each of the monomer and the oligomer, can be set to 18,900 mPa·s or less.

As described above, the anti-corrosive material according to the present embodiment includes an ultraviolet curable resin including a polymerizable compound including at least one of a photopolymerizable (meth)acrylate monomer or a photopolymerizable (meth)acrylate oligomer. The polymerizable compound includes a combination of a monofunctional (meth)acrylate monomer and a bifunctional (meth)acrylate monomer, or a combination of at least one of a monofunctional (meth)acrylate monomer or a bifunctional (meth)acrylate monomer and at least one of a trifunctional (meth)acrylate monomer or a polyfunctional (meth)acrylate monomer having four or more functional groups. The anti-corrosive material has a viscosity of 18,900 mPa·s or less, the viscosity being measured at 25° C. according to JIS Z8803.

In the present embodiment, the ultraviolet curable resin in which the (meth)acrylate monomer having a small number of functional groups and the (meth)acrylate monomer having a large number of functional groups are mixed is used as the anti-corrosive material. For this reason, the cured object to be obtained has an appropriate cross linking density, and hence can have improved elongation in addition to strength, hardness, and surface curability. Further, when the monomer contained in the ultraviolet curable resin is constituted of only a polyfunctional (meth)acrylate monomer having three or more functional groups, depth curability is reduced, the resin in the anti-corrosive material is not sufficiently cured and peels off from the joint, and anti-corrosive performance is reduced in some cases. However, in the present embodiment, the ultraviolet curable resin contains a (meth)acrylate compound having a small number of functional groups. Thus, reduction of depth curability can be suppressed, peeling can be prevented, and anti-corrosive performance can be improved.

Further, the anti-corrosive material has a viscosity that is equal to or lower than a predetermined value. Thus, the application thickness is prevented from being excessively increased, and increase in thickness of the coating that is obtained through curing can be prevented. Moreover, the anti-corrosive material is cured instantaneously through irradiation with ultraviolet light, and a washing step or a drying step is not required. Thus, the process can be shortened. Further, in the present embodiment, the anti-corrosive material in a liquid form is applied to the joint, and is irradiated with ultraviolet light and cured. Thus, when the wire and the joint have any shapes, a sealing member excellent in anti-corrosive performance can be formed.

Note that the anti-corrosive material preferably has an elongation rate of 60% or greater as a result of heating at 120° C. for 4,000 hours after curing. In a case where the elongation rate is set to 60% or greater, the sealing member can be elongated in accordance with the wire even when the wire receives an external force and is bent to apply a load to the sealing member obtained by curing the anti-corrosive material. For this reason, a risk that the sealing member peels off from the wire or the metal terminal can be reduced, and sealing performance exerted when the wire with a terminal is mounted to the connector housing can be improved. Particularly, the anti-corrosive material after curing tends to be hardened and less elongated when being heated. Thus, quality of the wire with a terminal can be improved by setting the elongation rate to 60% or greater. The elongation rate can be obtained by calculation of a mathematical expression of ((distance between bench marks of sealing member after tensile test)−(distance between bench marks of sealing member before tensile test))/(distance between bench marks of sealing member before tensile test). The tensile test can be conducted by using a publicly known tensile test machine and pulling the sealing member at a test speed of 200 mm/min at a room temperature (23° C.) until the sealing member breaks.

Further, the elongation rate is preferably 60% or greater when a thermal shock test is conducted after curing the anti-corrosive material. The thermal shock test is a test of repeating a cycle 1,000 times. In one cycle, the anti-corrosive material after curing is maintained at −40° C. for 30 minutes, is maintained at 120° C. for 30 minutes by switching the temperature to 120° C. by a damper, and is cooled by switching the temperature to −40° C. by the damper. In a case where the elongation rate is set to 60% or greater, the sealing member can be elongated in accordance with the wire even when the wire receives an external force and is bent to apply a load to the sealing member obtained by curing the anti-corrosive material. For this reason, a risk that the sealing member peels off from the wire or the metal terminal can be reduced, and sealing performance exerted when the wire with a terminal is mounted to the connector housing can be improved. Particularly, the anti-corrosive material after curing tends to be hardened and less elongated when being heated. Thus, quality of the wire with a terminal can be improved by setting the elongation rate to 60% or greater. The elongation rate can be obtained by calculation of a mathematical expression of ((distance between bench marks of sealing member after tensile test)−(distance between bench marks of sealing member before tensile test))/(distance between bench marks of sealing member before tensile test). The tensile test can be conducted by using a publicly known tensile test machine and pulling the sealing member at a test speed of 200 mm/min at a room temperature (23° C.) until the sealing member breaks.

Further, a glass transition temperature after curing of the anti-corrosive material is preferably 29° C. or higher. With this, even when any chemicals such as oil adhere to the wire with a terminal, a risk that the sealing member peels off from the wire or the metal terminal can be reduced, and sealing performance exerted when the wire with a terminal is mounted to the connector housing can be improved. A higher glass transition temperature is preferred, and hence the maximum value thereof is not limited. For example, the glass transition temperature may be 100° C. or lower. In order to increase the glass transition temperature of the ultraviolet curable resin, a compounding ratio of at least one of the (meth)acrylate monomer or the (meth)acrylate oligomer having a high glass transition temperature may be increased, for example.

[Wire with Terminal]

Figure 2:
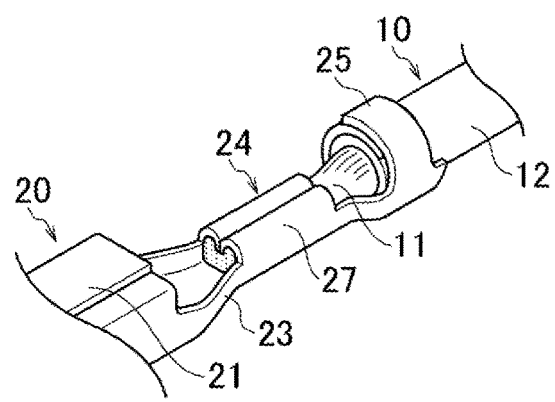
FIG. 2 is a schematic view of the wire with a terminal according to the present embodiment for illustrating a state in which the wire is connected to the metal terminal.
Figure 3:
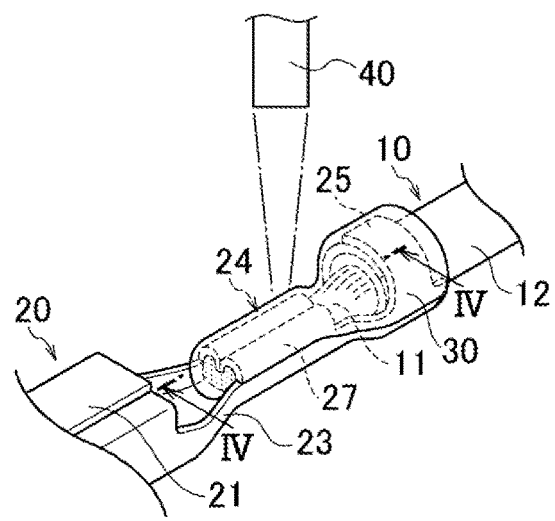
FIG. 3 is a schematic view of the wire with a terminal according to the present embodiment for illustrating a state in which an anti-corrosive material is applied to a joint between a metal terminal and a conductor and is cured.

Next, a wire with a terminal according to the present embodiment is described. As illustrated in FIG. 1 to FIG. 3, a wire with a terminal 1 according to the present embodiment includes a wire 10 and a metal terminal 20. The wire 10 includes a conductor 11 having conductivity and a wire covering member 12 configured to cover the conductor 11. The metal terminal 20 is connected to the conductor 11 of the wire 10. Moreover, the wire with a terminal 1 includes a sealing member 30 configured to cover a joint between the conductor 11 and the metal terminal 20, the sealing member 30 being formed by curing the above-mentioned anti-corrosive material.

The sealing member 30 is a cured object obtained by irradiating the anti-corrosive material containing the above-mentioned ultraviolet curable resin with ultraviolet light and curing the anti-corrosive material.

Metal having high conductivity may be used as a material of the conductor 11 of the wire 10. Usable materials include copper, a copper alloy, aluminum, and an aluminum alloy. Further, the surface of the conductor 11 may be subjected to tin plating. However, in recent years, reduction in weight of the wire harness has been demanded. In view of this, aluminum or an aluminum alloy having light weight is preferably used as the conductor 11. For this reason, the conductor 11 preferably includes an elemental wire formed of aluminum or an aluminum alloy.

A resin capable of securing an electric insulation property may be used as a material of the wire covering member 12 configured to cover the conductor 11. For example, a resin containing polyvinyl chloride (PVC) as a main component or an olefin-based resin may be used. Specific examples of the olefin-based resin include polyethylene (PE), polypropylene (PP), an ethylene copolymer, and a propylene copolymer.

Metal having high conductivity may be used as a material (terminal material) of the metal terminal 20. For example, at least one of copper, a copper alloy, stainless steel, copper subjected to tin plating, a copper alloy subjected to tin plating, or stainless steel subjected to tin plating may be used. Further, at least one of copper, a copper alloy, or stainless steel that are subjected to gold plating may be used. Alternatively, at least one of copper, a copper alloy, or stainless steel that are subjected to silver plating may be used. Note that the metal terminal 20 preferably contains copper or a copper alloy.

The metal terminal 20 of the wire with a terminal 1 is a female type, and includes an electrical connection portion 21 at its front part, which is connected to a mating terminal (not shown). The electrical connection portion 21 includes a built-in spring piece engageable with the mating terminal, and has a box-like shape. Moreover, the metal terminal 20 includes a wire connection portion 22 at its rear part. The wire connection portion 22 is provided to the electrical connection portion 21 through intermediation of a connection portion 23, and is connected by crimping with respect to the terminal portion of the wire 10.

The wire connection portion 22 includes a conductor press-fitting portion 24 positioned on the front side and a covering member crimping portion 25 positioned on the rear side.

The conductor press-fitting portion 24 on the front side is brought into direct contact with the conductor 11 that is exposed by removing the wire covering member 12 at the terminal portion of the wire 10, and includes a bottom plate portion 26 and a pair of conductor crimping pieces 27. The pair of conductor crimping pieces 27 extend upward from both lateral sides of the bottom plate portion 26, and are bent inward so as to wrap the conductor 11 of the wire 10, thereby crimping the conductor 11 under a close contact state with the upper surface of the bottom plate portion 26. With the bottom plate portion 26 and the pair of conductor crimping pieces 27, the conductor press-fitting portion 24 is formed to have a substantially U-like shape in a cross-sectional view.

Further, the covering member crimping portion 25 on the rear side is brought into direct contact with the wire covering member 12 at the terminal portion of the wire 10, and includes a bottom plate portion 28 and a pair of covering member crimping pieces 29. The pair of covering member crimping pieces 29 extend upward from both lateral sides of the bottom plate portion 28, and are bent inward so as to wrap a part having the wire covering member 12, thereby crimping the wire covering member 12 under a close contact state with the upper surface of the bottom plate portion 28. With the bottom plate portion 28 and the pair of covering member crimping pieces 29, the covering member crimping portion 25 is formed to have a substantially U-like shape in a cross-sectional view. Here, a common base plate portion is formed continuously from the bottom plate portion 26 of the conductor press-fitting portion 24 to the bottom plate portion 28 of the covering member crimping portion 25.

In the present embodiment, as illustrated in FIG. 1 and FIG. 2, the terminal portion of the wire 10 is inserted into the wire connection portion 22 of the metal terminal 20 having the above-mentioned configuration. With this, the conductor 11 of the wire 10 is placed on the upper surface of the bottom plate portion 26 of the conductor press-fitting portion 24. At the same time, the portion of the wire 10 with the wire covering member 12 is placed on the upper surface of the bottom plate portion 28 of the covering member crimping portion 25. Further, the wire connection portion 22 and the terminal portion of the wire 10 are pressed against each other, and thus the conductor press-fitting portion 24 and the covering member crimping portion 25 are deformed. Specifically, the pair of conductor crimping pieces 27 of the conductor press-fitting portion 24 are bent inward so as to wrap the conductor 11, thereby crimping the conductor 11 under a close contact state with the upper surface of the bottom plate portion 26. Moreover, the pair of covering member crimping pieces 29 of the covering member crimping portion 25 are bent inward so as to wrap a part having the wire covering member 12, thereby crimping the wire covering member 12 under a close contact state with the upper surface of the bottom plate portion 28. In this manner, the metal terminal 20 and the wire 10 can be connected to each other through press fitting.

Figure 4:
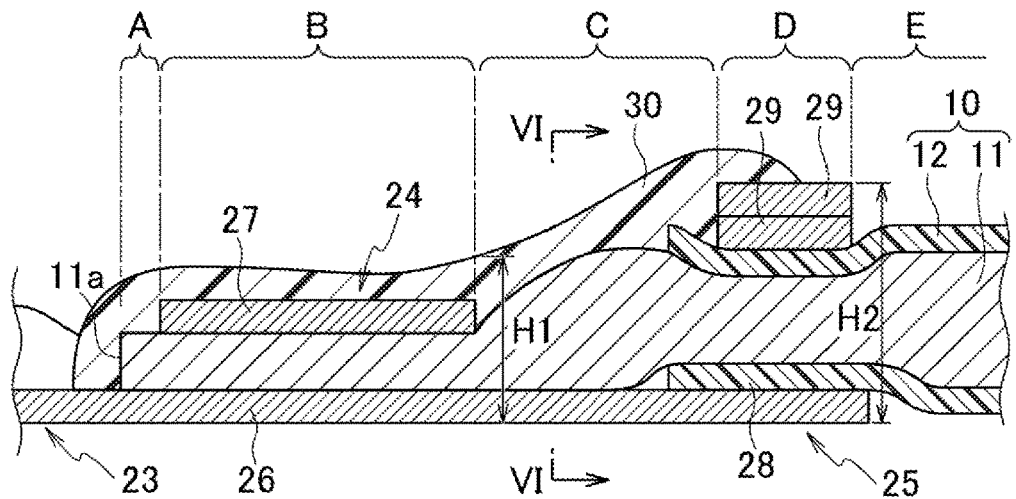
FIG. 4 is a cross-sectional view taken along the line IV-IV of FIG. 3.

Further, as illustrated in FIG. 3, in the present embodiment, the sealing member 30 covers the connection portion 23, the wire connection portion 22, and the upper part of the wire covering member 12, which is covered with the wire connection portion 22. The sealing member 30 covers the upper part of the wire covering member 12, which is covered with the wire connection portion 22, and thus corrosion of the joint between the conductor 11 and the wire connection portion 22 can be suppressed. As illustrated in FIG. 4, the sealing member 30 preferably covers a region A, a region B, a region C, and a region D subsequently in the stated order from a distal end 11a of the conductor 11.

The region A is a region where a part of the conductor 11 in the vicinity of the distal end 11a with respect to the conductor press-fitting portion 24 is exposed. Specifically, the distal end 11a of the conductor 11 and a part of an outer circumferential surface of the conductor 11 in the vicinity of the distal end 11a correspond to an exposed region of the conductor 11, that is, the region A. When the sealing member 30 covers the region A, the surface of the conductor 11 is covered with the sealing member 30 to be brought into direct contact with the sealing member 30. However, the distal end 11a of the conductor 11 is not required to protrude from the conductor press-fitting portion 24. Thus, as in the region B, the outer circumferential surface of the conductor 11 in the vicinity of the distal end 11a may be covered with the conductor press-fitting portion 24 to be brought direct contact with the conductor press-fitting portion 24 instead of being brought into contact with the anti-corrosive material.

The region B is a region where the conductor 11 is press-fitted by the conductor press-fitting portion 24 and the outer circumferential surface of the conductor 11 is covered with the conductor press-fitting portion 24. When the sealing member 30 covers the region B, at least a part of the outer surface of the conductor crimping pieces 27 is covered with the sealing member 30 to be brought into direct contact with the sealing member 30. In the region B, the conductor 11 is wrapped by the conductor press-fitting portion 24, and hence is not required to be brought into direct contact with the sealing member 30.

The region C is a region between the conductor press-fitting portion 24 and the covering member crimping portion 25, where a part of the outer circumferential surface of the conductor 11 is exposed. When the sealing member 30 covers the region C, a part of the outer circumferential surface of the conductor 11 is covered with the sealing member 30 to be brought into direct contact with the sealing member 30. In the region C, the wire covering member 12 may be covered with the sealing member 30 to be brought into direct contact with the sealing member 30.

The region D is a region where the wire 10 including the conductor 11 and the wire covering member 12 is press-fitted by the covering member crimping portion 25 and the outer circumferential surface of the wire 10 is covered with the covering member crimping portion 25. When the sealing member 30 covers the region D, at least a part of the outer surface of the covering member crimping pieces 29 is covered with the sealing member 30 to be brought into direct contact with the sealing member 30. In the region D, the wire 10 is surrounded by the covering member crimping portion 25, and hence is not required to be brought into direct contact with the sealing member 30.

As described above, the metal terminal 20 may include the conductor press-fitting portion 24 that is electrically connected to the conductor 11 of the wire 10 and the covering member crimping portion 25 that is mechanically connected to the wire covering member 12. As illustrated in FIG. 4, a total height H1 of the conductor press-fitting portion 24 and the sealing member 30 is preferably smaller than a height H2 of the covering member crimping portion 25. The height H1 is a height from the bottom surface of the bottom plate portion 26 of the conductor press-fitting portion 24 to the outer surface of the sealing member 30, and is the largest height in the region B. The height H2 is a height from the bottom surface of the bottom plate portion 28 of the covering member crimping portion 25 and the top surface of the covering member crimping pieces 29, and the largest height in the region D. The height H1 is set smaller than the height H2 so as to reduce a risk that the wire with a terminal 1 is brought into contact with the circumferential wall of the housing at the time of insertion, which may hinder the insertion. For this reason, workability at the time of inserting the wire with a terminal 1 into the housing can be improved.

Figure 5:
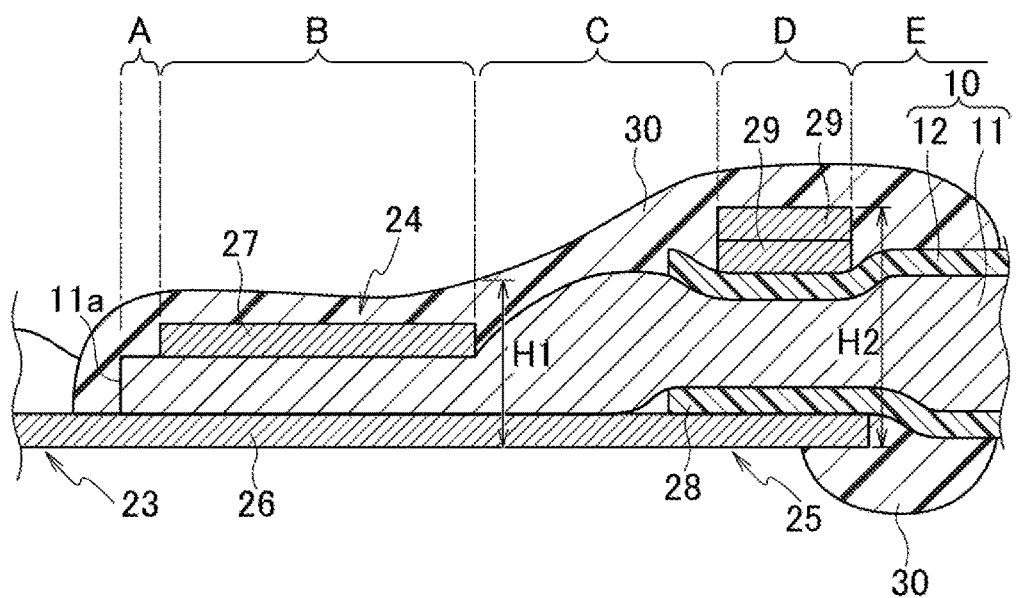
FIG. 5 is a cross-sectional view illustrating another example of the wire with a terminal according to the present embodiment.

Note that the sealing member 30 preferably covers a part of the connection portion 23 over the boundary between the conductor press-fitting portion 24 and the conductor 11 and a part of the wire covering member 12 over the boundary between the covering member crimping portion 25 and the wire covering member 12 so as to secure high anti-corrosive performance. Specifically, as illustrated in FIG. 5, the sealing member 30 preferably covers the region A, the region B, the region C, the region D, and a region E. More specifically, the sealing member 30 preferably covers the joint between the conductor 11 and the metal terminal 20, and all the boundaries between the wire 10 and the covering member crimping portion 25.

The region E is a region on a side of the region D, which is opposite to the region C, and is a region where the outer circumferential surface of the wire covering member 12 is exposed. When the sealing member 30 covers the region E, a part of the outer circumferential surface of the wire covering member 12 is covered with the sealing member 30 to be brought into direct contact with the sealing member 30. Further, when the sealing member 30 covers the region E, the boundary between the wire 10 and the covering member crimping portion 25 is also covered with the sealing member 30. For this reason, moisture can be prevented from entering the inside between the covering member crimping portion 25 and the wire covering member 12 and from arriving at the joint between the conductor 11 and the metal terminal 20. With this, corrosion of the conductor 11 can be prevented. The entire circumference of the boundary between the wire 10 and the covering member crimping portion 25 is preferably covered with the sealing member 30 so that moisture is less likely to enter the inside from the boundary between the wire 10 and the covering member crimping portion 25, which is the boundary between the region D and the region E.

Figure 6:
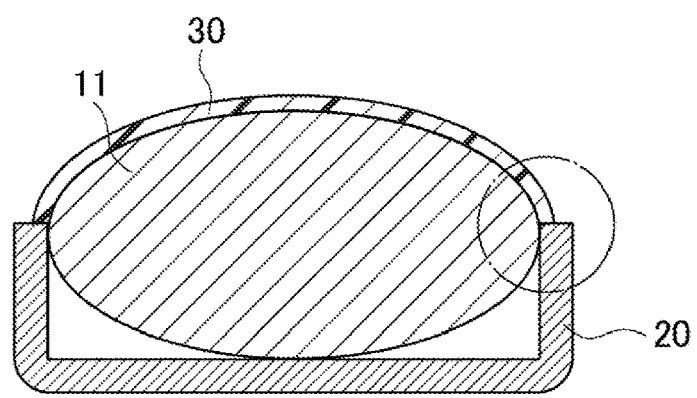
FIG. 6 is a cross-sectional view taken along the line VI-VI of FIG. 4.

Note that, as illustrated in FIG. 6, in the region C, arrangement is performed so that a part of the conductor 11 is accommodated inside the metal terminal 20 having a U-like shape and that another part of the conductor 11 protrudes from the opening of the metal terminal 20. As illustrated in FIG. 6 and FIG. 7 to FIG. 9 obtained by enlarging the part surrounded by the dotted line of FIG. 6, the sealing member 30 preferably covers a part of the end surface of the metal terminal 20 in addition to the exposed outer circumferential surface of the conductor 11 on the upper surface side.

Figure 7:
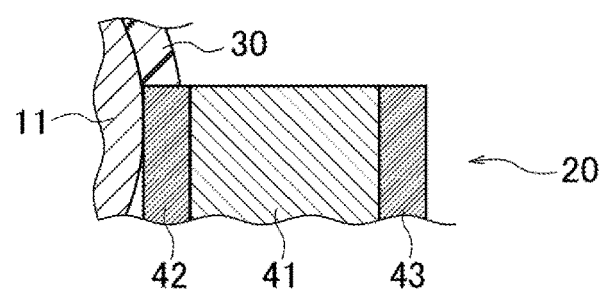
FIG. 7 is a view of one example illustrating an end of the metal terminal in an enlarged manner.
Figure 8:
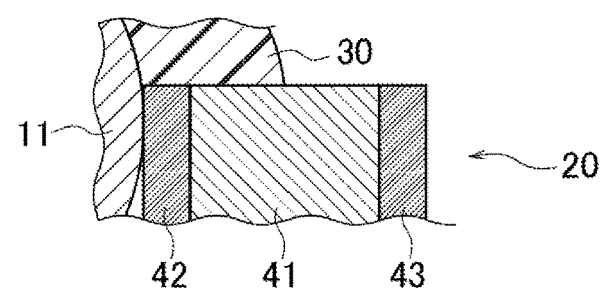
FIG. 8 is a view of another example illustrating an end of the metal terminal in an enlarged manner.
Figure 9:
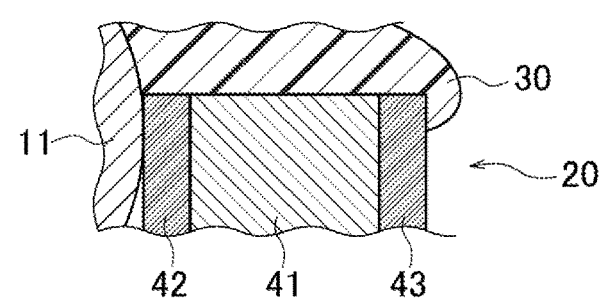
FIG. 9 is a view of another example illustrating an end of the metal terminal in an enlarged manner.

As illustrated in FIG. 7 to FIG. 9, the metal terminal 20 may include a metal base material 41, an inner plating 42 provided to a surface of the metal base material 41 on which the conductor 11 is arranged, an outer plating 43 provided to the other surface of the metal base material 41 with respect to the conductor 11, so as to improve anti-corrosive performance. When the metal terminal 20 is formed by subjecting one metal plate to punching and bending, the metal plate is cut. Thus, at the edge of the metal terminal 20, the metal base material 41 is exposed.

As illustrated in FIG. 7, the sealing member 30 may cover only the inner plating 42 instead of covering the metal base material 41 and the outer plating 43 at the edge of the metal terminal 20. Further, as illustrated in FIG. 8, the sealing member 30 may cover a part of the metal base material 41 and the inner plating 42 instead of covering the outer plating 43 at the edge of the metal terminal 20. Further, as illustrated in FIG. 9, the sealing member 30 may cover the inner plating 42, the metal base material 41, and the outer plating 43 at the edge of the metal terminal 20. Among those cases, the sealing member 30 preferably covers a part of the metal base material 41 and the inner plating 42 instead of covering the outer plating 43 at the edge of the metal terminal 20 in the region C being a region between the conductor press-fitting portion 24 and the covering member crimping portion 25, as illustrated in FIG. 8. When the sealing member 30 covers the edge of the metal terminal 20 as described above, moisture can be prevented from entering the inside between the conductor 11 and the metal terminal 20 in the region C. With this, corrosion of the conductor 11 at the joint between the conductor 11 and the metal terminal 20 can be prevented.

Specifically, in a case where the sealing member 30 covers the edge of the metal terminal 20 as illustrated in FIG. 7, when the inner plating 42 has an ionization tendency smaller than an ionization tendency of the metal base material 41, there may be a risk that the inner plating 42 is lost due to sacrificial corrosion. In this case, there may be a risk that moisture enters the inside of the metal terminal 20 between the sealing member 30 and the metal base material 41. Meanwhile, when the sealing member 30 covers the edge of the metal terminal 20 as illustrated in FIG. 9, the sealing member 30 covering the side surface of the outer plating 43 is brought into contact with the circumferential wall of the housing, which may hinder the insertion. In view of this, when the sealing member 30 covers the edge of the metal terminal 20 as illustrated in FIG. 8, anti-corrosive performance and connector housing insertion performance can be improved.

Next, a method of manufacturing the wire with a terminal 1 according to the present embodiment is described. As illustrated in FIG. 1 and FIG. 2, first, in the wire with a terminal 1, the terminal portion of the wire 10 is inserted into the wire connection portion 22 of the metal terminal 20. With this, the conductor 11 of the wire 10 is placed on the upper surface of the bottom plate portion 26 of the conductor press-fitting portion 24. At the same time, the portion of the wire 10 with the wire covering member 12 is placed on the upper surface of the bottom plate portion 28 of the covering member crimping portion 25. Further, the pair of conductor crimping pieces 27 of the conductor press-fitting portion 24 are bent inward, thereby crimping the conductor 11 under a close contact state with the upper surface of the bottom plate portion 26. Moreover, the pair of covering member crimping pieces 29 of the covering member crimping portion 25 are bent inward, thereby crimping the wire covering member 12 under a close contact with the upper surface of the bottom plate portion 28. With this, the metal terminal 20 and the wire 10 can be connected to each other.

Subsequently, the anti-corrosive material is applied to the joint between the metal terminal 20 and the wire 10. At this stage, the method of applying the anti-corrosive material is not particularly limited, and a coating machine of a dispenser type may be used, for example. As illustrated in FIG. 3, the anti-corrosive material is applied so as to cover the joint. The anti-corrosive material preferably covers a part of the connection portion 23 over the boundary between the conductor press-fitting portion 24 and the conductor 11.

Subsequently, the metal terminal 20 and the wire 10 to which the ultraviolet curable resin is applied are irradiated with ultraviolet light through use of an ultraviolet light irradiation device 40. Any one of a mercury lamp, a high-pressure mercury lamp, an ultra high-pressure mercury lamp, a metal halide lamp, and an LED lamp may be used as the ultraviolet light irradiation device 40. An irradiation amount and an irradiation time of ultraviolet light may be set appropriately in accordance with the ultraviolet curable resin to be used and the application amount. Further, the ultraviolet curable resin is irradiated with ultraviolet light, and is cured instantaneously before non-uniformity is caused in the ultraviolet curable resin. With this, the sealing member 30 is formed on the surfaces of the metal terminal 20 and the wire 10.

Note that the ultraviolet curable resin is known to cause reaction inhibition when being brought into contact with oxygen through curing. One of the causes of the reaction inhibition is oxygen in the air that reacts with radicals generated by the photopolymerization initiator and eliminates the radicals. With this, a polymerization reaction of the ultraviolet curable resin is reduced, and hence curing of the resin is not sufficiently promoted. For this reason, the ultraviolet curable resin that is less affected by the oxygen curing inhibition is preferably used.

Note that a step of cooling the sealing member 30 may be performed as required after the ultraviolet curable resin is irradiated with ultraviolet light and cured. Examples of the method of cooling the sealing member 30 include a cooling method in which air is sent and brought into contact with the sealing member 30, for example.

As described above, the wire with a terminal 1 according to the present embodiment includes the sealing member 30 obtained by curing the above-mentioned anti-corrosive material with ultraviolet light. Further, the anti-corrosive material has a viscosity that is equal to or lower than a predetermined value. Thus, the application thickness is prevented from being excessively increased, and increase in thickness of the coating that is obtained through curing can be prevented. As a result, as described later, it is not required to change a pitch dimension of a connector housing. Thus, the wire with a terminal 1 according to the present embodiment can be inserted into a connector housing having a conventional size. For this reason, it is not required to change design of a connector housing for the wire with a terminal 1 according to the present embodiment.

[Wire Harness]

Figure 10:
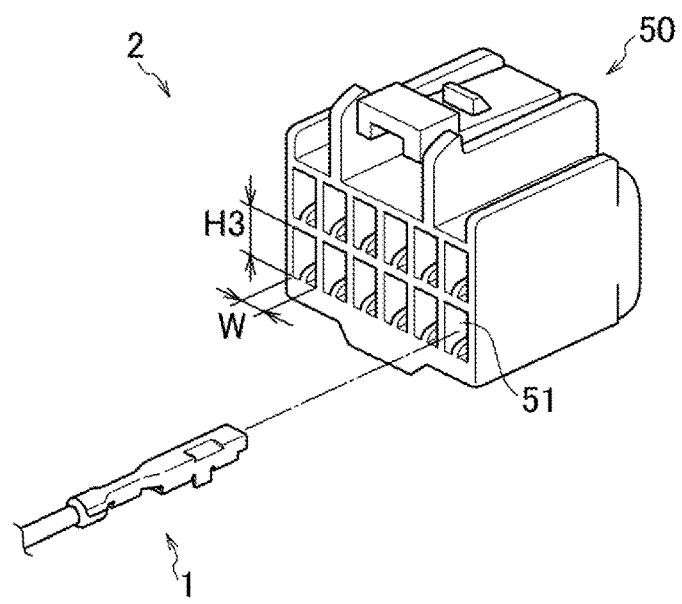
FIG. 10 is a perspective view illustrating a wire harness according to the present embodiment.

Next, a wire harness according to the present embodiment is described. The wire harness according to the present embodiment includes the above-mentioned wire with a terminal 1. Specifically, as illustrated in FIG. 10, a wire harness 2 includes a connector housing 50 and the above-mentioned wire with a terminal 1.

On a front surface side of the connector housing 50, a plurality of mating-side terminal mounting portions (not shown) to which mating terminals (not shown) are mounted are provided. Further, on a back surface side of the connector housing 50, a plurality of cavities 51 are provided. Each of the cavities 51 has a substantially rectangular opening that allows the metal terminal 20 and the sealing member 30 of the wire with a terminal 1 to be mounted therein. Moreover, the opening of each of the cavities 51 is formed to be slightly larger than the cross-section of the metal terminal 20 and the sealing member 30. Further, the metal terminal 20 is mounted to the connector housing 50, and the wire 10 is drawn out from the back surface side of the connector housing 50.

Here, as described above, the anti-corrosive material according to the present embodiment has a viscosity that is equal to or lower than a predetermined value. Thus, the application thickness is prevented from being excessively increased, and increase in thickness of the coating (sealing member 30) that is obtained through curing can be prevented. For this reason, the width of the sealing member 30 of the wire with a terminal 1 can be set smaller than an opening width W of the cavity 51 of the connector housing 50 into which the metal terminal 20 and the sealing member 30 are inserted. Moreover, the maximum height of the anti-corrosive material of the wire with a terminal 1 can be set smaller than an opening height H3 of the cavity 51 of the connector housing 50.

As described above, the thickness of the sealing member 30 of the present embodiment can be reduced. Thus, it is not required to particularly change the pitch dimension of the connector housing 50. For this reason, the wire with a terminal 1 can be inserted into a connector housing having a conventional size. Thus, it is not required to change design of a connector housing particularly for the wire with a terminal 1, and a conventional connector housing can be used.

EXAMPLES

The present embodiment is further described below in detail with Examples and Comparative Examples. However, the present embodiment is not limited to those examples.

Example A

The following compounds were used as oligomers, monomers, and a photopolymerization initiator when a wire with a terminal in each of the examples and comparative examples was produced.

Oligomer 1: EBECRYL (registered trademark) 8402 (aliphatic urethane acrylate) produced by DAICEL-ALLNEX LTD., average molecular weight Mw: 1000, viscosity: 12,500 mPa·s at a temperature of 25° C., cured object glass transition temperature: 14° C.

Oligomer 2: EBECRYL 4858 (aliphatic urethane acrylate) produced by DAICEL-ALLNEX LTD., average molecular weight Mw: 450, viscosity: 7,000 mPa·s at a temperature of 25° C., cured object glass transition temperature: 54° C.

Monofunctional monomer: IBOA (isobornyl acrylate) produced by DAICEL-ALLNEX LTD, viscosity: 9.5 mPa·s at a temperature of 25° C., cured object glass transition temperature: 97° C.

Bifunctional monomer: TPGDA (tripropylene glycol diacrylate) produced by DAICEL-ALLNEX LTD., viscosity: 12.5 mPa·s at a temperature of 25° C., cured object glass transition temperature: 55° C.

Trifunctional monomer 1: PETRA (pentaerythritol triacrylate) produced by DAICEL-ALLNEX LTD., viscosity: 650 mPa·s at a temperature of 25° C., cured object glass transition temperature: 103° C.

Trifunctional monomer 2: TMPTA (trimethylolpropane triacrylate) produced by DAICEL-ALLNEX LTD., viscosity: 100 mPa·s at a temperature of 25° C., cured object glass transition temperature: 62° C.

Polyfunctional monomer: EBECRYL 140 (ditrimethylolpropane tetraacrylate) produced by DAICEL-ALLNEX LTD., viscosity: 1000 mPa·s at a temperature of 25° C., cured object glass transition temperature: 98° C.

Photopolymerization initiator: IRGACURE (registered trademark) 369 produced by BASF SE Example A-1

First, the monofunctional monomer, the bifunctional monomer, and the photopolymerization initiator were mixed in mass proportions of 85, 15, and 2, respectively, with respect to 100 parts by mass of the oligomer 1 to prepare an anti-corrosive material.

Subsequently, aluminum was used as a conductor, and polyvinyl chloride (PVC) was used as a wire covering member to prepare a wire. Moreover, copper subjected to tin plating was used as a terminal material to prepare a metal terminal.

Further, a wire with a terminal in this example was prepared by connecting the wire and the metal terminal with each other, applying the anti-corrosive material to the joint between the metal terminal and the wire, and curing the anti-corrosive material through use of a UV lamp.

Example A-2

The monofunctional monomer, the bifunctional monomer, the trifunctional monomer 1, the polyfunctional monomer, and the photopolymerization initiator were mixed in mass proportions of 25, 5, 4, 1, and 2, respectively, with respect to 100 parts by mass of the oligomer 1 to prepare an anti-corrosive material. Except for this, a wire with a terminal in this example was prepared in the same manner as in Example A-1.

Example A-3

The monofunctional monomer, the bifunctional monomer, the trifunctional monomer 1, and the photopolymerization initiator were mixed in mass proportions of 3, 1, 1, and 2, respectively, with respect to 100 parts by mass of the oligomer 1 to prepare an anti-corrosive material. Except for this, a wire with a terminal in this example was prepared in the same manner as in Example A-1.

Example A-4

The monofunctional monomer, the bifunctional monomer, the polyfunctional monomer, and the photopolymerization initiator were mixed in mass proportions of 25, 10, 5, and 2, respectively, with respect to 100 parts by mass of the oligomer 1 to prepare an anti-corrosive material. Except for this, a wire with a terminal in this example was prepared in the same manner as in Example A-1.

Example A-5

The monofunctional monomer, the trifunctional monomer 1, and the photopolymerization initiator were mixed in mass proportions of 25, 3, and 2, respectively, with respect to 100 parts by mass of the oligomer 1 to prepare an anti-corrosive material. Except for this, a wire with a terminal in this example was prepared in the same manner as in Example A-1.

Example A-6

The bifunctional monomer, the polyfunctional monomer, and the photopolymerization initiator were mixed in mass proportions of 8, 2, and 2, respectively, with respect to 100 parts by mass of the oligomer 1 to prepare an anti-corrosive material. Except for this, a wire with a terminal in this example was prepared in the same manner as in Example A-1.

Comparative Example A-1

The monofunctional monomer and the photopolymerization initiator were mixed in mass proportions of 90 and 2, respectively, with respect to 100 parts by mass of the oligomer 1 to prepare an anti-corrosive material. Except for this, a wire with a terminal in this example was prepared in the same manner as in Example A-1.

Comparative Example A-2

The bifunctional monomer and the photopolymerization initiator were mixed in mass proportions of 60 and 2, respectively, with respect to 100 parts by mass of the oligomer 1 to prepare an anti-corrosive material. Except for this, a wire with a terminal in this example was prepared in the same manner as in Example A-1.

Comparative Example A-3

The trifunctional monomer 2 and the photopolymerization initiator were mixed in mass proportions of 50 and 2, respectively, with respect to 100 parts by mass of the oligomer 1 to prepare an anti-corrosive material. Except for this, a wire with a terminal in this example was prepared in the same manner as in Example A-1.

Comparative Example A-4

The polyfunctional monomer and the photopolymerization initiator were mixed in mass proportions of 3 and 2, respectively, with respect to 100 parts by mass of the oligomer 2 to prepare an anti-corrosive material. Except for this, a wire with a terminal in this example was prepared in the same manner as in Example A-1.

Comparative Example A-5

The trifunctional monomer 2, the polyfunctional monomer, and the photopolymerization initiator were mixed in mass proportions of 8, 3, and 2, respectively, with respect to 100 parts by mass of the oligomer 1 to prepare an anti-corrosive material. Except for this, a wire with a terminal in this example was prepared in the same manner as in Example A-1.

(Viscosity Measurement)

A viscosity of the anti-corrosive material prepared in each of the examples and comparative examples was measured at a temperature of 25° C. according to JIS Z8803. The viscosity was measured through use of a B-type rotational viscometer (TH-10H) at 50 rpm.

(Evaluation on Connector Housing Insertion Performance)

The wire with a terminal in each example was inserted into a connector housing. Whether the sealing member was brought into contact with a circumferential wall of a cavity at the time of insertion into the connector housing was determined by visual observation. A case where the sealing member was not brought into contact with the circumferential wall of the cavity was evaluated as "satisfactory". Otherwise, an evaluation as "poor" was given. Note that, in this evaluation, a wire ALVSS 2sq was used, and a connector housing 2.3II was used.

(Evaluation on Anti-Corrosive Performance)

The anti-corrosive performance of the wire with a terminal prepared in each of the examples and comparative examples was evaluated based on the measurement method specified in Japanese Industrial Standards JIS C60068-2-11 (Basic Environmental Testing Procedures Part 2: Tests-Test Ka: Salt mist). Specifically, the joint between the conductor and the metal terminal of the wire with a terminal was subjected to a salt mist test. More specifically, the test was performed under the following conditions: a temperature of 35±2° C., relative humidity (RH) of 85% or higher, a concentration of salt water of 5±1%, and the test period of 4 days. After that, whether corrosion (rust) was generated at the joint in each example was determined by visual observation. A case where corrosion was not confirmed was evaluated as "satisfactory". Otherwise, an evaluation as "poor" was given.

The oligomers, the monomers, and the photopolymerization initiator that were used in Examples and Comparative Examples and the results of viscosities of the anti-corrosive materials, evaluation on connector housing insertion performance, and evaluation on anti-corrosive performance are shown in Table 1 and Table 2.

In contrast, in Comparative Examples A-1 to A-4 in which the monofunctional (meth)acrylate monomer, the bifunctional (meth)acrylate monomer, the trifunctional (meth)acrylate monomer, or the polyfunctional (meth)acrylate monomer was used alone, the insufficient results were given with regard to anti-corrosive performance. Further, in Comparative Example A-5 in which the trifunctional (meth)acrylate monomer and the polyfunctional (meth)acrylate monomer were used in combination, the inside of the anti-corrosive material was not sufficiently cured, and the

TABLE 1

| | | Product name | Example A-1 | Example A-2 | Example A-3 | Example A-4 | Example A-5 | Example A-6 |
|---|---|---|---|---|---|---|---|---|
| Composition | Oligomer 1 (parts by mass) | EBECRYL 8402 | 100 | 100 | 100 | 100 | 100 | 100 |
| | Oligomer 2 (parts by mass) | EBECRYL 4858 | — | — | — | — | — | — |
| | Monofunctional monomer (parts by mass) | IBOA | 85 | 25 | 3 | 25 | 25 | — |
| | Bifunctional monomer (parts by mass) | TPGDA | 15 | 5 | 1 | 10 | — | 8 |
| | Trifunctional monomer 1 (parts by mass) | PETRA | — | 4 | 1 | — | 3 | — |
| | Trifunctional monomer 2 (parts by mass) | TMPTA | — | — | — | — | — | — |
| | Polyfunctional monomer (parts by mass) | EBECRYL 140 | — | 1 | — | 5 | — | 2 |
| | Photopolymerization initiator (parts by mass) | IRGACURE 369 | 2 | 2 | 2 | 2 | 2 | 2 |
| Evaluation | Viscosity (mPa·s) | | 330 | 2900 | 9700 | 2300 | 4250 | 18900 |
| | Connector insertion performance | | Satisfactory | Satisfactory | Satisfactory | Satisfactory | Satisfactory | Satisfactory |
| | Anti-corrosive performance | | Satisfactory | Satisfactory | Satisfactory | Satisfactory | Satisfactory | Satisfactory |

TABLE 2

| | | Product name | Comparative Example A-1 | Comparative Example A-2 | Comparative Example A-3 | Comparative Example A-4 | Comparative Example A-5 |
|---|---|---|---|---|---|---|---|
| Composition | Oligomer 1 (parts by mass) | EBECRYL 8402 | 100 | 100 | 100 | — | 100 |
| | Oligomer 2 (parts by mass) | EBECRYL 4858 | — | — | — | 100 | — |
| | Monofunctional monomer (parts by mass) | IBOA | 90 | — | — | — | — |
| | Bifunctional monomer (parts by mass) | TPGDA | — | 60 | — | — | — |
| | Trifunctional monomer 1 (parts by mass) | PETRA | — | — | — | — | — |
| | Trifunctional monomer 2 (parts by mass) | TMPTA | — | — | 50 | — | 8 |
| | Polyfunctional monomer (parts by mass) | EBECRYL 140 | — | — | — | 3 | 3 |
| | Photopolymerization initiator (parts by mass) | IRGACURE 369 | 2 | 2 | 2 | 2 | 2 |
| Evaluation | Viscosity (mPa·s) | | 400 | 1050 | 5200 | 7500 | 21000 |
| | Connector insertion performance | | Satisfactory | Satisfactory | Satisfactory | Satisfactory | Poor |
| | Anti-corrosive performance | | Poor | Poor | Poor | Poor | Poor |

As shown in Table 1, in Example A-1 in which the monofunctional (meth)acrylate monomer and the bifunctional (meth)acrylate monomer were used in combination, the satisfactory results were given in evaluation on anti-corrosive performance and evaluation on connector housing insertion performance. Further, in Example A-2 to Example A-6 in which at least one of the monofunctional (meth)acrylate monomer or the bifunctional (meth)acrylate monomer and at least one of the trifunctional (meth)acrylate monomer or the polyfunctional (meth)acrylate monomer were used in combination, the satisfactory results were also given in evaluation on anti-corrosive performance and evaluation on connector housing insertion performance.

anti-corrosive material peeled off. Thus, the insufficient results were given with regard to anti-corrosive performance. Moreover, the anti-corrosive material in Comparative Example A-5 had a high viscosity, and the thickness of the sealing member that was obtained was increased. Thus, the insertion into the connector housing was hindered.

Example B

The compounds described above were used as oligomers, monomers, and a photopolymerization initiator when a wire with a terminal in each of the examples and comparative examples was produced.

Example B-1

First, the monofunctional monomer, the bifunctional monomer, and the photopolymerization initiator were mixed in mass proportions of 85, 15, and 2, respectively, with respect to 100 parts by mass of the oligomer 1 to prepare an anti-corrosive material.

Subsequently, aluminum was used as a conductor, and polyvinyl chloride (PVC) was used as a wire covering member to prepare a wire. Moreover, copper subjected to tin plating was used as a terminal material to prepare a metal terminal.

Further, a wire with a terminal in this example was prepared by connecting the wire and the metal terminal with each other, applying the anti-corrosive material to the joint between the metal terminal and the wire, and curing the anti-corrosive material through use of a UV lamp.

Example B-2

The monofunctional monomer, the bifunctional monomer, the trifunctional monomer 1, the polyfunctional monomer, and the photopolymerization initiator were mixed in mass proportions of 25, 5, 4, 1, and 2, respectively, with respect to 100 parts by mass of the oligomer 1 to prepare an anti-corrosive material. Except for this, a wire with a terminal in this example was prepared in the same manner as in Example B-1.

Example B-3

The monofunctional monomer, the bifunctional monomer, the trifunctional monomer 1, and the photopolymerization initiator were mixed in mass proportions of 3, 1, 1, and 2, respectively, with respect to 100 parts by mass of the oligomer 1 to prepare an anti-corrosive material. Except for this, a wire with a terminal in this example was prepared in the same manner as in Example B-1.

Example B-4

The monofunctional monomer, the bifunctional monomer, the polyfunctional monomer, and the photopolymerization initiator were mixed in mass proportions of 25, 10, 5, and 2, respectively, with respect to 100 parts by mass of the oligomer 1 to prepare an anti-corrosive material. Except for this, a wire with a terminal in this example was prepared in the same manner as in Example B-1.

Comparative Example B-1

The monofunctional monomer and the photopolymerization initiator were mixed in mass proportions of 90 and 2, respectively, with respect to 100 parts by mass of the oligomer 1 to prepare an anti-corrosive material. Except for this, a wire with a terminal in this example was prepared in the same manner as in Example B-1.

Comparative Example B-2

The bifunctional monomer and the photopolymerization initiator were mixed in mass proportions of 60 and 2, respectively, with respect to 100 parts by mass of the oligomer 1 to prepare an anti-corrosive material. Except for this, a wire with a terminal in this example was prepared in the same manner as in Example B-1.

(Elongation Rate After Heat Resistance Test)

The anti-corrosive material in each example was sufficiently irradiated with ultraviolet light, and the anti-corrosive material was cured. In this manner, a No. 3 dumbbell according to JIS K6251 was prepared. Irradiation was performed with ultraviolet light at a cumulative radiation amount of 1,000 mJ/cm$^2$ or greater through use of a UV irradiation device including an LED having a peak wavelength of 365 nm. Subsequently, the test piece was put in an oven, and was subjected to a heat resistance test for performing heating at 120° C. for 4,000 hours. The test piece after the heat resistance test (sealing member) was pulled at a test speed of 200 mm/min at a room temperature (23° C.) through use of a tensile test machine until the test piece was broken. The elongation rate was obtained by calculation of a mathematical expression of ((distance between bench marks of sealing member after tensile test)−(distance between bench marks of sealing member before tensile test))/(distance between bench marks of sealing member before tensile test).

(Evaluation on Anti-Corrosive Performance)

Anti-corrosive performance was evaluated in the same manner as in the above-mentioned method.

(Evaluation on Sealing Performance)

A distal end of a male housing was inserted into a female housing to which the wire with a female terminal in each example was mounted, and the resultant was immersed in water. An air tube capable of introducing air was provided to the male housing, and air having a pressure of 200 kPa was introduced into the connector through the air tube. A case where leakage of air from the connector was not confirmed when the pressure reached 200 kPa was evaluated as "satisfactory". A case where leakage of air from the connector was confirmed before the pressure reached 200 kPa was evaluated as "poor".

The oligomers, the monomers, and the photopolymerization initiator that were used in Examples and Comparative Examples and the results of elongation rates after the heat resistance test, evaluation on anti-corrosive performance, and evaluation on sealing performance are shown in Table 3.

TABLE 3

| | | Product name | Example B-1 | Example B-2 | Example B-3 | Example B-4 | Comparative Example B-1 | Comparative Example B-2 |
|---|---|---|---|---|---|---|---|---|
| Composition | Oligomer 1 (parts by mass) | EBECRYL 8402 | 100 | 100 | 100 | 100 | — | 100 |
| | Oligomer 2 (parts by mass) | EBECRYL 4858 | — | — | — | — | — | — |
| | Monofunctional monomer (parts by mass) | IBOA | 85 | 25 | 3 | 25 | 90 | — |
| | Bifunctional monomer (parts by mass) | TPGDA | 15 | 5 | 1 | 10 | — | 60 |

TABLE 3-continued

|  | Product name | Example B-1 | Example B-2 | Example B-3 | Example B-4 | Comparative Example B-1 | Comparative Example B-2 |
|---|---|---|---|---|---|---|---|
| Trifunctional monomer 1 (parts by mass) | PETRA | — | 4 | 1 | — | — | — |
| Trifunctional monomer 2 (parts by mass) | TMPTA | — | — | — | — | — | — |
| Polyfunctional monomer (parts by mass) | EBECRYL 140 | — | 1 | — | 5 | — | — |
| Photopolymerization initiator (parts by mass) | IRGACURE 369 | 2 | 2 | 2 | 2 | 2 | 2 |
| Evaluation: Elongation rate after heat resistance test | | 100 | 200 | 160 | 90 | 5 | 10 |
| Anti-corrosive performance | | Satisfactory | Satisfactory | Satisfactory | Satisfactory | Poor | Poor |
| Sealing performance | | Satisfactory | Satisfactory | Satisfactory | Satisfactory | Poor | Poor |

As shown in Table 3, the test piece in each of Examples B-1 to Example B-4 had an elongation rate of 60% or greater as a result of heating at 120° C. for 4,000 hours. Thus, the satisfactory results were given in evaluation on anti-corrosive performance and evaluation on sealing performance. In contrast, the test piece in each of Comparative Example B-1 to Comparative Example B-2 had an elongation rate less than 60% as a result of heating at 120° C. for 4,000 hours. Thus, the insufficient results were given with regard to anti-corrosive performance and sealing performance. From those results, it is understood that the sealing member having an elongation rate of 60% or greater as a result of heating at 120° C. for 4,000 hours after curing can improve anti-corrosive performance and sealing performance.

Example C

The compounds described above were used as oligomers, monomers, and a photopolymerization initiator when a wire with a terminal in each of the examples and comparative examples was produced.

Example C-1

First, the monofunctional monomer, the bifunctional monomer, and the photopolymerization initiator were mixed in mass proportions of 85, 15, and 2, respectively, with respect to 100 parts by mass of the oligomer 1 to prepare an anti-corrosive material.

Subsequently, aluminum was used as a conductor, and polyvinyl chloride (PVC) was used as a wire covering member to prepare a wire. Moreover, copper subjected to tin plating was used as a terminal material to prepare a metal terminal.

Further, a wire with a terminal in this example was prepared by connecting the wire and the metal terminal with each other, applying the anti-corrosive material to the joint between the metal terminal and the wire, and curing the anti-corrosive material through use of a UV lamp.

Example C-2

The monofunctional monomer, the bifunctional monomer, the trifunctional monomer 1, the polyfunctional monomer, and the photopolymerization initiator were mixed in mass proportions of 25, 5, 4, 1, and 2, respectively, with respect to 100 parts by mass of the oligomer 1 to prepare an anti-corrosive material. Except for this, a wire with a terminal in this example was prepared in the same manner as in Example C-1.

Example C-3

The monofunctional monomer, the bifunctional monomer, the trifunctional monomer 1, and the photopolymerization initiator were mixed in mass proportions of 3, 1, 1, and 2, respectively, with respect to 100 parts by mass of the oligomer 1 to prepare an anti-corrosive material. Except for this, a wire with a terminal in this example was prepared in the same manner as in Example C-1.

Example C-4

The monofunctional monomer, the bifunctional monomer, the polyfunctional monomer, and the photopolymerization initiator were mixed in mass proportions of 25, 10, 5, and 2, respectively, with respect to 100 parts by mass of the oligomer 1 to prepare an anti-corrosive material. Except for this, a wire with a terminal in this example was prepared in the same manner as in Example C-1.

Comparative Example C-1

The monofunctional monomer and the photopolymerization initiator were mixed in mass proportions of 90 and 2, respectively, with respect to 100 parts by mass of the oligomer 1 to prepare an anti-corrosive material. Except for this, a wire with a terminal in this example was prepared in the same manner as in Example C-1.

Comparative Example C-2

The bifunctional monomer and the photopolymerization initiator were mixed in mass proportions of 60 and 2, respectively, with respect to 100 parts by mass of the oligomer 1 to prepare an anti-corrosive material. Except for this, a wire with a terminal in this example was prepared in the same manner as in Example C-1.

(Elongation Rate After Thermal Shock Test)

The anti-corrosive material in each example was sufficiently irradiated with ultraviolet light, and the anti-corrosive material was cured. In this manner, a No. 3 dumbbell according to JIS K6251 was prepared. Irradiation was performed with ultraviolet light at a cumulative radiation amount of 1,000 mJ/cm$^2$ or greater through use of a UV irradiation device including an LED having a peak wavelength of 365 nm. Subsequently, the test piece was subjected to the thermal shock test of repeating a cycle 1,000 times. In one cycle, the test piece was maintained at −40° C. for 30 minutes, was maintained at 120° C. for 30 minutes by switching the temperature to 120° C. by a damper, and was cooled by switching the temperature to −40° C. by the damper. The test piece (sealing member) after the thermal shock test was pulled at a test speed of 200 mm/min at a room temperature (23° C.) through use of a tensile test machine until the test piece was broken. The elongation rate was obtained by calculation of a mathematical expression of ((distance between bench marks of sealing member after tensile test)−(distance between bench marks of sealing member before tensile test))/(distance between bench marks of sealing member before tensile test).

(Evaluation on Anti-Corrosive Performance)

Anti-corrosive performance was evaluated in the same manner as in the above-mentioned method.

(Evaluation on Sealing Performance)

Sealing performance was evaluated in the same manner as in the above-mentioned method.

The oligomers, the monomers, and the photopolymerization initiator that were used in Examples and Comparative Examples and the results of elongation rates after the thermal shock test, evaluation on anti-corrosive performance, and evaluation on sealing performance are shown in Table 4.

TABLE 4

| | | Product name | Example C-1 | Example C-2 | Example C-3 | Example C-4 | Comparative Example C-1 | Comparative Example C-2 |
|---|---|---|---|---|---|---|---|---|
| Composition | Oligomer 1 (parts by mass) | EBECRYL 8402 | 100 | 100 | 100 | 100 | 100 | 100 |
| | Oligomer 2 (parts by mass) | EBECRYL 4858 | — | — | — | — | — | — |
| | Monofunctional monomer (parts by mass) | IBOA | 85 | 25 | 3 | 25 | 90 | — |
| | Bifunctional monomer (parts by mass) | TPGDA | 15 | 5 | 1 | 10 | — | 60 |
| | Trifunctional monomer 1 (parts by mass) | PETRA | — | 4 | 1 | — | — | — |
| | Trifunctional monomer 2 (parts by mass) | TMPTA | — | — | — | — | — | — |
| | Polyfunctional monomer (parts by mass) | EBECRYL 140 | — | 1 | — | 5 | — | — |
| | Photopolymerization initiator (parts by mass) | IRGACURE 369 | 2 | 2 | 2 | 2 | 2 | 2 |
| Evaluation | Elongation rate after thermal shock test | | 150 | 220 | 150 | 60 | 25 | 15 |
| | Anti-corrosive performance | | Satisfactory | Satisfactory | Satisfactory | Satisfactory | Poor | Poor |
| | Sealing performance | | Satisfactory | Satisfactory | Satisfactory | Satisfactory | Poor | Poor |

As shown in Table 4, the test piece in each of Example C-1 to Example C-4 had an elongation rate of 60% or greater after the thermal shock test. Thus, the satisfactory results were given in evaluation on anti-corrosive performance and evaluation on sealing performance. In contrast, the test piece in each of Comparative Example C-1 to Comparative Example C-2 had an elongation rate less than 60% after the thermal shock test. Thus, the insufficient results were given with regard to anti-corrosive performance and sealing performance. From those results, it is understood that the sealing member having an elongation rate of 60% or greater, which is subjected to the thermal shock test after curing, can improve anti-corrosive performance and sealing performance.

Example D

The compounds described above were used as oligomers, monomers, and a photopolymerization initiator when a wire with a terminal in each of the examples and comparative examples was produced.

Example D-1

First, the monofunctional monomer, the bifunctional monomer, and the photopolymerization initiator were mixed in mass proportions of 85, 15, and 2, respectively, with respect to 100 parts by mass of the oligomer 1 to prepare an anti-corrosive material.

Subsequently, aluminum was used as a conductor, and polyvinyl chloride (PVC) was used as a wire covering member to prepare a wire. Moreover, copper subjected to tin plating was used as a terminal material to prepare a metal terminal.

Further, a wire with a terminal in this example was prepared by connecting the wire and the metal terminal with each other, applying the anti-corrosive material to the joint between the metal terminal and the wire, and curing the anti-corrosive material through use of a UV lamp.

Example D-2

The monofunctional monomer, the bifunctional monomer, the trifunctional monomer 1, the polyfunctional monomer, and the photopolymerization initiator were mixed in mass proportions of 25, 5, 4, 1, and 2, respectively, with respect to 100 parts by mass of the oligomer 1 to prepare an anti-corrosive material. Except for this, a wire with a terminal in this example was prepared in the same manner as in Example D-1.

Example D-3

The monofunctional monomer, the bifunctional monomer, the trifunctional monomer 1, and the photopolymerization initiator were mixed in mass proportions of 3, 1, 1, and 2, respectively, with respect to 100 parts by mass of the oligomer 1 to prepare an anti-corrosive material. Except for this, a wire with a terminal in this example was prepared in the same manner as in Example D-1.

Example D-4

The monofunctional monomer, the bifunctional monomer, the polyfunctional monomer, and the photopolymerization initiator were mixed in mass proportions of 25, 10, 5, and 2, respectively, with respect to 100 parts by mass of the oligomer 1 to prepare an anti-corrosive material. Except for this, a wire with a terminal in this example was prepared in the same manner as in Example D-1.

Comparative Example D-1

The monofunctional monomer and the photopolymerization initiator were mixed in mass proportions of 90 and 2, respectively, with respect to 100 parts by mass of the oligomer 1 to prepare an anti-corrosive material. Except for this, a wire with a terminal in this example was prepared in the same manner as in Example D-1.

Comparative Example D-2

The bifunctional monomer and the photopolymerization initiator were mixed in mass proportions of 60 and 2, respectively, with respect to 100 parts by mass of the oligomer 1 to prepare an anti-corrosive material. Except for this, a wire with a terminal in this example was prepared in the same manner as in Example D-1.

(Glass Transition Temperature)

The anti-corrosive material in each example was sufficiently irradiated with ultraviolet light, and the anti-corrosive material was cured. In this manner, a No. 3 dumbbell according to JIS K6251 was prepared. Irradiation was performed with ultraviolet light at a cumulative radiation amount of 1,000 mJ/cm$^2$ or greater through use of a UV irradiation device including an LED having a peak wavelength of 365 nm. Subsequently, a storage modulus and a loss modulus of the test piece were measured through dynamic mechanical analysis (DMA) under the following conditions: a temperature of −40° C. to 150° C., a frequency of 1 Hz, a displacement of 0.05 mm, and a tensile mode. A loss tangent (tan δ) was calculated from the storage modulus and the loss modulus, and a peak temperature of the loss tangent (tan δ) was regarded as a glass transition temperature.

(Evaluation on Adhesive Performance)

The wire with a terminal was immersed in brake oil (product name: BF-3) produced by Mazda Motor Corporation at 85° C. for 60 minutes. A case where the sealing member obtained by curing the anti-corrosive material did not peel from the wire or the metal terminal was evaluated as "satisfactory". Otherwise, an evaluation as "poor" was given.

The oligomers, the monomers, and the photopolymerization initiator that were used in Examples and Comparative Examples and the results of glass transition temperatures and evaluation on adhesive performance are shown in Table 5.

TABLE 5

| | | Product name | Example D-1 | Example D-2 | Example D-3 | Example D-4 | Comparative Example D-1 | Comparative Example D-2 |
|---|---|---|---|---|---|---|---|---|
| Composition | Oligomer 1 (parts by mass) | EBECRYL 8402 | 100 | 100 | 100 | 100 | 100 | 100 |
| | Oligomer 2 (parts by mass) | EBECRYL 4858 | — | — | — | — | — | — |
| | Monofunctional monomer (parts by mass) | IBOA | 85 | 25 | 3 | 25 | 90 | — |
| | Bifunctional monomer (parts by mass) | TPGDA | 15 | 5 | 1 | 10 | — | 60 |
| | Trifunctional monomer 1 (parts by mass) | PETRA | — | 4 | 1 | — | — | — |
| | Trifunctional monomer 2 (parts by mass) | TMPTA | — | — | — | — | — | — |
| | Polyfunctional monomer (parts by mass) | EBECRYL 140 | — | 1 | — | 5 | — | — |
| | Photopolymerization initiator (parts by mass) | IRGACURE 369 | 2 | 2 | 2 | 2 | 2 | 2 |
| Evaluation | Glass transition temperature (° C.) | | 35 | 34 | 31 | 29 | 25 | 27 |
| | Adhesive performance | | Satisfactory | Satisfactory | Satisfactory | Satisfactory | Poor | Poor |

As shown in Table 5, the test piece in each of Example D-1 to Example D-4 had a glass transition temperature of 29° C. or higher. Thus, the satisfactory results were given in evaluation on adhesive performance. In contrast, the test piece in each of Comparative Example D-1 to Comparative Example D-2 had a glass transition temperature lower than 27° C. Thus, the insufficient results were given with regard to adhesive performance. From those results, it is understood that the sealing member having a glass transition temperature of 29° C. or higher can improve adhesive performance with respect to the wire or the metal terminal.

Example E

The compounds described above were used as oligomers, monomers, and a photopolymerization initiator when a wire with a terminal in each of the examples and comparative examples was produced.

Example E-1

First, the monofunctional monomer, the bifunctional monomer, and the photopolymerization initiator were mixed in mass proportions of 85, 15, and 2, respectively, with respect to 100 parts by mass of the oligomer 1 to prepare an anti-corrosive material.

Subsequently, aluminum was used as a conductor, and polyvinyl chloride (PVC) was used as a wire covering member to prepare a wire. Moreover, copper subjected to tin plating was used as a terminal material to prepare a metal terminal.

Further, a wire with a terminal in this example was prepared by connecting the wire and the metal terminal with each other, applying the anti-corrosive material to the joint between the metal terminal and the wire so that the height H1 was lower than the height H2 as illustrated in FIG. 4, and curing the anti-corrosive material through use of a UV lamp.

Example E-2

The monofunctional monomer, the bifunctional monomer, the trifunctional monomer 1, the polyfunctional monomer, and the photopolymerization initiator were mixed in mass proportions of 25, 5, 4, 1, and 2, respectively, with respect to 100 parts by mass of the oligomer 1 to prepare an anti-corrosive material. Except for this, a wire with a terminal in this example was prepared in the same manner as in Example E-1.

Example E-3

The monofunctional monomer, the bifunctional monomer, the trifunctional monomer 1, and the photopolymerization initiator were mixed in mass proportions of 3, 1, 1, and 2, respectively, with respect to 100 parts by mass of the oligomer 1 to prepare an anti-corrosive material. Except for this, a wire with a terminal in this example was prepared in the same manner as in Example E-1.

Example E-4

The bifunctional monomer, the polyfunctional monomer, and the photopolymerization initiator were mixed in mass proportions of 8, 2, and 2, respectively, with respect to 100 parts by mass of the oligomer 1 to prepare an anti-corrosive material. Except for this, a wire with a terminal in this example was prepared in the same manner as in Example E-1.

Comparative Example E-1

The anti-corrosive material was applied so that the height H1 was larger than the height H2 as illustrated in FIG. 4. Except for this, a wire with a terminal in this example was prepared in the same manner as in Example E-1.

Comparative Example E-2

The anti-corrosive material was applied so that the height H1 was larger than the height H2 as illustrated in FIG. 4. Except for this, a wire with a terminal in this example was prepared in the same manner as in Example E-2.

Comparative Example E-3

The anti-corrosive material was applied so that the height H1 was larger than the height H2 as illustrated in FIG. 4. Except for this, a wire with a terminal in this example was prepared in the same manner as in Example E-3.

Comparative Example E-4

The anti-corrosive material was applied so that the height H1 was larger than the height H2 as illustrated in FIG. 4. Except for this, a wire with a terminal in this example was prepared in the same manner as in Example E-4.

(Viscosity Measurement)

A viscosity was measured in the same manner as in the above-mentioned method.

(Height H1/Height H2)

A case where the height H1 was smaller than the height H2 was expressed as "less than 1". A case where the height H1 was equal to or larger than the height H2 was expressed as "1 or greater".

(Evaluation on Connector Housing Insertion Performance)

Connector housing insertion performance was evaluated in the same manner as in the above-mentioned method.

The oligomers, the monomers, and the photopolymerization initiator that were used in Examples and Comparative Examples and the results of viscosities of the anti-corrosive materials, the heights H1/the heights H2, and evaluation on connector housing insertion performance are shown in Table 6.

TABLE 6

|  |  | Product name | Example E-1 | Example E-2 | Example E-3 | Example E-4 | Comparative Example E-1 | Comparative Example E-2 | Comparative Example E-3 | Comparative Example E-4 |
|---|---|---|---|---|---|---|---|---|---|---|
| Composition | Oligomer 1 (parts by mass) | EBECRYL 8402 | 100 | 100 | 100 | 100 | 100 | 100 | 100 | 100 |
|  | Oligomer 2 (parts by mass) | EBECRYL 4858 | — | — | — | — | — | — | — | — |
|  | Monofunctional monomer (parts by mass) | IBOA | 85 | 25 | 3 | — | 85 | 25 | 3 | — |
|  | Bifunctional monomer (parts by mass) | TPGDA | 15 | 5 | 1 | 8 | 15 | 5 | 1 | 8 |
|  | Trifunctional monomer 1 (parts by mass) | PETRA | — | 4 | 1 | — | — | 4 | 1 | — |
|  | Trifunctional monomer 2 (parts by mass) | TMPTA | — | — | — | — | — | — | — | — |
|  | Polyfunctional monomer (parts by mass) | EBECRYL 140 | — | 1 | — | 2 | — | 1 | — | 2 |
|  | Photopolymerization initiator (parts by mass) | IRGACURE 369 | 2 | 2 | 2 | 2 | 2 | 2 | 2 | 2 |
| Evaluation | Viscosity (mPa · s) |  | 330 | 2900 | 9700 | 18900 | 330 | 2900 | 9700 | 18900 |
|  | Height H1/Height H2 |  | Less than 1 | Less than 1 | Less than 1 | Less than 1 | 1 or greater | 1 or greater | 1 or greater | 1 or greater |
|  | Connector insertion performance |  | Satisfactory | Satisfactory | Satisfactory | Satisfactory | Poor | Poor | Poor | Poor |

As shown in Table 6, in the wire with a terminal in each of Example E-1 to Example E-4, the satisfactory results were given in evaluation on connector housing insertion performance. In contrast, in the wire with a terminal in each of Comparative Example E-1 to Comparative Example E-4, the sealing member was brought into contact with the circumferential wall of the cavity, which hindered the insertion. From those results, it is understood that connector housing insertion performance can be improved when the height H1 is smaller than the height H2.

Example F

The compounds described above were used as oligomers, monomers, and a photopolymerization initiator when a wire with a terminal in each of the examples and comparative examples was produced.

Example F-1

First, the monofunctional monomer, the bifunctional monomer, and the photopolymerization initiator were mixed in mass proportions of 85, 15, and 2, respectively, with respect to 100 parts by mass of the oligomer 1 to prepare an anti-corrosive material.

Subsequently, aluminum was used as a conductor, and polyvinyl chloride (PVC) was used as a wire covering member to prepare a wire. Moreover, copper subjected to tin plating was used as a terminal material to prepare a metal terminal.

Further, a wire with a terminal in this example was prepared by connecting the wire and the metal terminal with each other, applying the anti-corrosive material to the joint between the metal terminal and the wire, and curing the anti-corrosive material through use of a UV lamp. The anti-corrosive material was applied to cover the region A, the region B, the region C, the region D, and the region E, as illustrated in FIG. 5. Specifically, the sealing member covered the joint between the conductor and the metal terminal and all the boundaries between the wire and the covering member crimping portion.

Example F-2

The monofunctional monomer, the bifunctional monomer, the trifunctional monomer 1, the polyfunctional monomer, and the photopolymerization initiator were mixed in mass proportions of 25, 5, 4, 1, and 2, respectively, with respect to 100 parts by mass of the oligomer 1 to prepare an anti-corrosive material. Except for this, a wire with a terminal in this example was prepared in the same manner as in Example F-1.

Example F-3

The monofunctional monomer, the bifunctional monomer, the trifunctional monomer 1, and the photopolymerization initiator were mixed in mass proportions of 3, 1, 1, and 2, respectively, with respect to 100 parts by mass of the oligomer 1 to prepare an anti-corrosive material. Except for this, a wire with a terminal in this example was prepared in the same manner as in Example F-1.

Example F-4

The monofunctional monomer, the bifunctional monomer, the polyfunctional monomer, and the photopolymerization initiator were mixed in mass proportions of 25, 10, 5, and 2, respectively, with respect to 100 parts by mass of the oligomer 1 to prepare an anti-corrosive material. Except for this, a wire with a terminal in this example was prepared in the same manner as in Example F-1.

Example F-5

The monofunctional monomer, the trifunctional monomer 1, and the photopolymerization initiator were mixed in mass proportions of 25, 3, and 2, respectively, with respect to 100 parts by mass of the oligomer 1 to prepare an anti-corrosive material. Except for this, a wire with a terminal in this example was prepared in the same manner as in Example F-1.

Example F-6

The bifunctional monomer, the polyfunctional monomer, and the photopolymerization initiator were mixed in mass proportions of 8, 2, and 2, respectively, with respect to 100 parts by mass of the oligomer 1 to prepare an anti-corrosive material. Except for this, a wire with a terminal in this example was prepared in the same manner as in Example F-1.

Comparative Example F-1

The anti-corrosive material was applied to cover the region A, the region B, the region C, and the region D, as illustrated in FIG. 4. Specifically, the sealing member covered the joint between the conductor and the metal terminal, and the sealing member did not cover the boundaries between the wire and the covering member crimping portion. Except for this, a wire with a terminal in this example was prepared in the same manner as in Example F-1.

Comparative Example F-2

The anti-corrosive material was applied to cover the region A, the region B, the region C, and the region D, as illustrated in FIG. 4. Except for this, a wire with a terminal in this example was prepared in the same manner as in Example F-2.

Comparative Example F-3

The anti-corrosive material was applied to cover the region A, the region B, the region C, and the region D, as illustrated in FIG. 4. Except for this, a wire with a terminal in this example was prepared in the same manner as in Example F-3.

Comparative Example F-4

The anti-corrosive material was applied to cover the region A, the region B, the region C, and the region D, as illustrated in FIG. 4. Except for this, a wire with a terminal in this example was prepared in the same manner as in Example F-4.

Comparative Example F-5

The anti-corrosive material was applied to cover the region A, the region B, the region C, and the region D, as illustrated in FIG. 4. Except for this, a wire with a terminal in this example was prepared in the same manner as in Example F-5.

Comparative Example F-6

The anti-corrosive material was applied to cover the region A, the region B, the region C, and the region D, as illustrated in FIG. 4. Except for this, a wire with a terminal in this example was prepared in the same manner as in Example F-6.

(Viscosity Measurement)

A viscosity was measured in the same manner as in the above-mentioned method.

(Evaluation on Anti-Corrosive Performance)

Anti-corrosive performance was evaluated in the same manner as in the above-mentioned method.

(Evaluation on Sealing Performance)

Sealing performance was evaluated in the same manner as in the above-mentioned method.

The ultraviolet curable resins that were used in Examples and Comparative Examples and the results of viscosities of the anti-corrosive materials, evaluation on anti-corrosive performance, and evaluation on sealing performance are shown in Table 7 and Table 8.

TABLE 7

| | | Product name | Example F-1 | Example F-2 | Example F-3 | Example F-4 | Example F-5 | Example F-6 |
|---|---|---|---|---|---|---|---|---|
| Composition | Oligomer 1 (parts by mass) | EBECRYL 8402 | 100 | 100 | 100 | 100 | 100 | 100 |
| | Oligomer 2 (parts by mass) | EBECRYL 4858 | — | — | — | — | — | — |
| | Monofunctional monomer (parts by mass) | IBOA | 85 | 25 | 3 | 25 | 25 | — |
| | Bifunctional monomer (parts by mass) | TPGDA | 15 | 5 | 1 | 10 | — | 8 |
| | Trifunctional monomer 1 (parts by mass) | PETRA | — | 4 | 1 | — | 3 | — |
| | Trifunctional monomer 2 (parts by mass) | TMPTA | — | — | — | — | — | — |
| | Polyfunctional monomer (parts by mass) | EBECRYL 140 | — | 1 | — | 5 | — | 2 |
| | Photopolymerization initiator (parts by mass) | IRGACURE 369 | 2 | 2 | 2 | 2 | 2 | 2 |
| Evaluation | | Application region | ABCDE | ABCDE | ABCDE | ABCDE | ABCDE | ABCDE |
| | | Viscosity (mPa·s) | 330 | 2900 | 9700 | 2300 | 4250 | 18900 |
| | | Anti-corrosive performance | Satisfactory | Satisfactory | Satisfactory | Satisfactory | Satisfactory | Satisfactory |
| | | Sealing performance | Satisfactory | Satisfactory | Satisfactory | Satisfactory | Satisfactory | Satisfactory |

TABLE 8

| | | Product name | Comparative Example F-1 | Comparative Example F-2 | Comparative Example F-3 | Comparative Example F-4 | Comparative Example F-5 | Comparative Example F-6 |
|---|---|---|---|---|---|---|---|---|
| Composition | Oligomer 1 (parts by mass) | EBECRYL 8402 | 100 | 100 | 100 | 100 | 100 | 100 |
| | Oligomer 2 (parts by mass) | EBECRYL 4858 | — | — | — | — | — | — |
| | Monofunctional monomer (parts by mass) | IBOA | 85 | 25 | 3 | 25 | 25 | — |
| | Bifunctional monomer (parts by mass) | TPGDA | 15 | 5 | 1 | 10 | — | 8 |
| | Trifunctional monomer 1 (parts by mass) | PETRA | — | 4 | 1 | — | 3 | — |
| | Trifunctional monomer 2 (parts by mass) | TMPTA | — | — | — | — | — | — |
| | Polyfunctional monomer (parts by mass) | EBECRYL 140 | — | 1 | — | 5 | — | 2 |
| | Photopolymerization initiator (parts by mass) | IRGACURE 369 | 2 | 2 | 2 | 2 | 2 | 2 |
| Evaluation | | Application region | ABCDE | ABCDE | ABCDE | ABCDE | ABCDE | ABCDE |
| | | Viscosity (mPa·s) | 330 | 2900 | 9700 | 2300 | 4250 | 18900 |
| | | Anti-corrosive performance | Poor | Poor | Poor | Poor | Poor | Poor |
| | | Sealing performance | Poor | Poor | Poor | Poor | Poor | Poor |

As shown in Table 7, in the wire with a terminal in each of Example F-1 to Example F-6, the sealing member covered the region A to the region E, and the sealing member covered the joint between the conductor and the metal terminal and all the boundaries between the wire and the covering member crimping portion. For this reason, the satisfactory results were given in evaluation on anti-corrosive performance and evaluation on sealing performance. In contrast, as shown in Table 8, the wire with a terminal in each of Comparative Example F-1 to Comparative Example F-6, the sealing member did not cover the region E, the sealing member covered the joint between the conductor and the metal terminal, and the sealing member did not cover the boundaries between the wire and the covering member crimping portion. For this reason, the insufficient results were given with regard to anti-corrosive performance and sealing performance.

From those results, it is understood that the wire with a terminal in which the sealing member covers all the boundaries between the wire and the covering member crimping portion can improve anti-corrosive performance and sealing performance.

The present embodiment is described above. The present embodiment is not limited thereto, and various modifications can be made within the scope of the present embodiment.

What is claimed is:

1. A wire with a terminal comprising:
    a wire including a conductor and a wire covering member configured to cover the conductor;
    a metal terminal including a conductor press-fitting portion that is electrically connected to the conductor and a covering member crimping portion that is mechanically connected to the wire covering member; and
    a sealing member configured to cover a joint between the conductor and the metal terminal, the sealing member being formed by curing an anti-corrosive material, wherein
    the metal terminal includes a metal base material, an inner plating provided to a surface of the metal base material on which the conductor is arranged, and an outer plating provided to the other surface of the metal base material with respect to the conductor,
    the anti-corrosive material comprises an ultraviolet curable resin comprising a polymerizable compound including at least one of a photopolymerizable (meth)acrylate monomer or a photopolymerizable (meth)acrylate oligomer,
    the anti-corrosive material covers only a part of the metal base material and the inner plating at an edge of the metal terminal between the conductor press-fitting portion and the covering member crimping portion,
    the polymerizable compound includes a combination of a monofunctional (meth)acrylate monomer and a bifunctional (meth)acrylate monomer, or a combination of at least one of a monofunctional (meth)acrylate monomer or a bifunctional (meth)acrylate monomer and at least one of a trifunctional (meth)acrylate monomer or a polyfunctional (meth)acrylate monomer having four or more functional groups,
    the anti-corrosive material has a viscosity of 18,900 mPa·s or less, the viscosity being measured at 25° C. according to JIS Z8803, and
    the anti-corrosive material has an elongation rate of 60% or greater as a result of heating at 120° C. for 4,000 hours after curing.

2. The wire with the terminal according to claim 1, wherein
    the conductor includes an elemental wire formed of aluminum or an aluminum alloy, and
    the metal terminal contains copper or a copper alloy.

3. A wire harness comprising:
    the wire with the terminal according to claim 1.

4. The wire with the terminal according to claim 1, wherein
    the sealing member configured to cover an entire borderline between the wire and the covering member crimping portion.

* * * * *